(12) United States Patent
Crystal et al.

(10) Patent No.: US 7,408,460 B2
(45) Date of Patent: Aug. 5, 2008

(54) GATHERING DATA CONCERNING PUBLICATION USAGE

(75) Inventors: Jack C. Crystal, Owings Mill, MD (US); James M. Jensen, Columbia, MD (US); Alan R. Neuhauser, Silver Spring, MD (US); Jack K. Zhang, Ijamsville, MD (US); Daniel W. Pugh, Catonsville, MD (US)

(73) Assignee: Arbitron, Inc., Columbia, MD (US)

( * ) Notice: Subject to any disclaimer, the term of this patent is extended or adjusted under 35 U.S.C. 154(b) by 49 days.

(21) Appl. No.: 11/084,646

(22) Filed: Mar. 18, 2005

(65) Prior Publication Data

US 2005/0272019 A1    Dec. 8, 2005

Related U.S. Application Data

(60) Provisional application No. 60/554,560, filed on Mar. 19, 2004.

(51) Int. Cl.
*G08B 21/00* (2006.01)
*G08B 23/00* (2006.01)
*B42D 3/18* (2006.01)

(52) U.S. Cl. .................. 340/540; 340/572.1; 340/5.92; 340/3.3; 340/825.69

(58) Field of Classification Search ................ 340/540, 340/3.3, 5.86, 5.92, 5.9, 3.31
See application file for complete search history.

(56) References Cited

U.S. PATENT DOCUMENTS

| | | | |
|---|---|---|---|
| 4,659,314 A | 4/1987 | Weinblatt | |
| 4,661,847 A | 4/1987 | Weinblatt | |
| 4,726,771 A | 2/1988 | Weinblatt | |
| 4,781,596 A | 11/1988 | Weinblatt | |
| 4,939,326 A | 7/1990 | Weinblatt | |
| 4,992,867 A | 2/1991 | Weinblatt | |
| 5,019,679 A | 5/1991 | Weinblatt | |
| 5,214,409 A * | 5/1993 | Beigel | ............... 340/572.1 |
| 5,234,345 A | 8/1993 | Weinblatt | |
| 5,483,276 A | 1/1996 | Brooks et al. | |
| 5,689,238 A | 11/1997 | Cannon, Jr. et al. | |
| 5,764,763 A | 6/1998 | Jensen et al. | |
| 5,963,134 A * | 10/1999 | Bowers et al. | ............ 340/572.1 |
| 6,037,879 A * | 3/2000 | Tuttle | .................. 340/10.4 |
| 6,232,870 B1 | 5/2001 | Garber et al. | |
| 6,600,419 B2 | 7/2003 | Barritz | |

(Continued)

FOREIGN PATENT DOCUMENTS

EP      0408348 A2     1/1991

(Continued)

OTHER PUBLICATIONS

"Objective Means of Determining Magazine Readership", SRI International, Baer, et al., Jul. 1982, pp. i-45.

(Continued)

*Primary Examiner*—Donnie L Crosland
(74) *Attorney, Agent, or Firm*—Katten Muchin Rosenman LLP

(57) ABSTRACT

Methods and systems for measuring and gathering data relating to publication usage by participants in publication readership studies. Some methods and systems employ portable monitors carried by participants of the studies along with publications fitted with various devices, such as piezoelectric transducers, RFID tags and others devices and circuits.

4 Claims, 19 Drawing Sheets

U.S. PATENT DOCUMENTS

| | | |
|---|---|---|
| 6,834,251 B1 | 12/2004 | Fletcher |
| 6,845,360 B2 | 1/2005 | Jensen et al. |
| 6,958,710 B2 | 10/2005 | Zhang et al. |
| 2002/0008623 A1 | 1/2002 | Garber et al. |
| 2002/0107727 A1 | 8/2002 | Traub |
| 2002/0113707 A1 | 8/2002 | Grunes et al. |
| 2002/0180588 A1 | 12/2002 | Erickson et al. |
| 2003/0005430 A1 | 1/2003 | Kolessar et al. |
| 2003/0033161 A1 | 2/2003 | Walker et al. |
| 2003/0041303 A1 | 2/2003 | Milton |
| 2003/0122708 A1 | 7/2003 | Percy et al. |
| 2003/0163287 A1 | 8/2003 | Vock et al. |
| 2003/0171833 A1 | 9/2003 | Crystal et al. |
| 2004/0015399 A1 | 1/2004 | Maggio |
| 2004/0054627 A1 | 3/2004 | Rutledge |
| 2004/0080452 A1 | 4/2004 | Percy et al. |
| 2004/0249497 A1 | 12/2004 | Saigh et al. |
| 2005/0035857 A1 | 2/2005 | Zhang et al. |
| 2005/0201826 A1 | 9/2005 | Zhang et al. |

FOREIGN PATENT DOCUMENTS

EP    0525947 B1    8/1997

OTHER PUBLICATIONS

"Electro-Mechanical Devices for Recording Readership: Report of a Development Project", Schreiber et al., 1983, pp. cover, 198-199 and 545-556.

"The Magazine Meter—1995: A Report Of The Watch Meter System", Douglas et al., 1988, pp. cover, 502-512 and List of Delegates.

\* cited by examiner

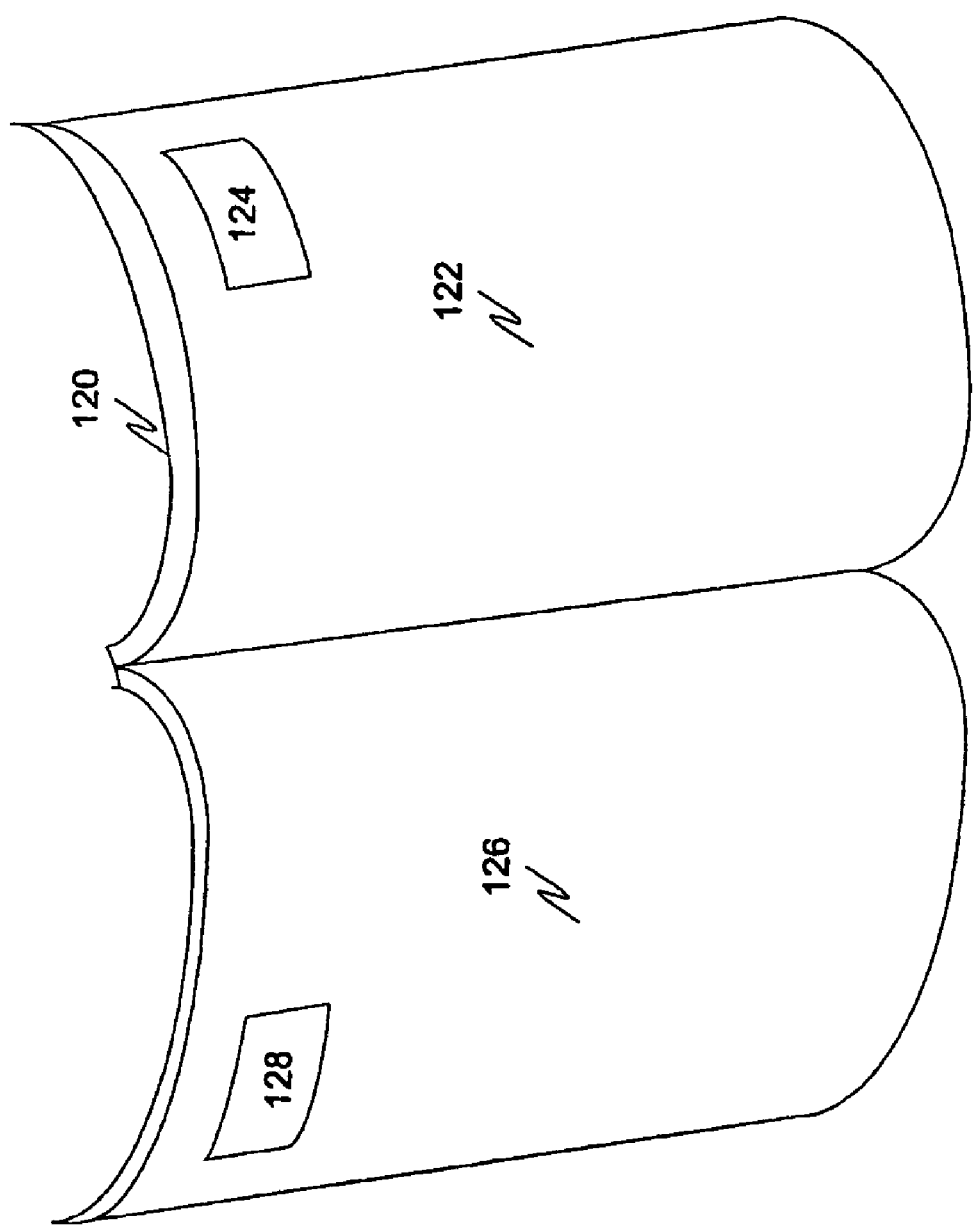

GATHERING DATA CONCERNING PUBLICATION USAGE

RELATED APPLICATION

This application claims the benefit of U.S. provisional patent application Ser. No. 60/554,560, filed Mar. 19, 2004, assigned to the assignee of the present invention and hereby incorporated herein by reference in its entirety.

FIELD OF THE INVENTION

The present invention concerns methods and systems for gathering data on the usage of publications.

BACKGROUND OF THE INVENTION

A wide variety of methods are available to track automatically consumer exposure to certain types of media, including television and radio. Television and radio employ receivable transmissions, whether visual, audible or otherwise electronically receivable, and thus are well-suited for measurement via electronic devices.

Other forms of consumer activity, however, do not employ such types of transmissions and thus are not readily measurable. In particular, consumer publication reading activity, including reading of magazines, newspapers, books, etc., is technologically inert. Currently, libraries, book stores and other commercial establishments that sell books and other types of publications employ radio frequency identification devices (RFIDs) as a way of preventing theft of such items. However, the actual purchase, renting or borrowing of a publication itself is insufficient information to identify or otherwise ascertain whether the publication has been read, or has been read multiple times, or to identify other useful information regarding the consumer's usage of that publication.

In view of the foregoing, publication usage tracking has heretofore principally entailed the use of consumer surveys and diaries, where consumers manually record or otherwise identify (e.g., during telephone interviews) their readership activity. Unfortunately, surveys and diaries are labor-intensive, intrusive to everyday life, and prone to either intentional and/or inadvertent misreporting.

It is desired, therefore, to seek ways of gathering data relating to publication usage that are easy to implement, error-resistant and minimally invasive to consumers.

SUMMARY OF THE INVENTION

For this application the following terms and definitions shall apply:

The term "publication" as used herein means one or more of a plurality of physical objects disseminated publicly or privately to convey data in printed form to persons, and includes but is not limited to, magazines, newspapers, mailings, catalogs, books, pamphlets, programs, advertising and promotional materials.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The terms "media data" and "media" as used herein mean data, other than publications, which is widely accessible, whether over-the-air, or via cable, satellite, network, internetwork (including the Internet), displayed, distributed on storage media, or by any other means or technique that is humanly perceptible, without regard to the form or content of such data, and including but not limited to audio, video, text, images, animations, databases, datasets, broadcasts, displays, signs, signals, web pages and streaming media data.

The term "network" as used herein includes both networks and internetworks of all kinds, including the Internet, and is not limited to any particular network or inter-network.

The terms "first" and "second" are used to distinguish one element, set, data, object, step, process, activity or thing from another, and are not used to designate relative position or arrangement in time, unless otherwise stated explicitly.

The terms "deformation", "deformed" and "deform" as used herein mean a change of shape or form or the act of changing a shape or form, of a publication or portion thereof, whether permanent or temporary, and whether destructive or non-destructive.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "communicate," "communicating" and "communication" as used herein include both conveying data from a source to a destination, and delivering data to a communications medium, system, device or link to be conveyed to a destination.

The term "processor" as used herein means processing devices, apparatus, programs, circuits, components, systems and subsystems, whether implemented in hardware, software or both.

The terms "storage," "data storage" and "memory" as used herein mean data storage devices, apparatus, programs, circuits, systems, subsystems and storage media serving to retain data, whether on a temporary or permanent basis, and to provide such retained data.

The term "database" as used herein means an organized body of related data, regardless of the manner in which the data or the organized body thereof is represented. For example, the organized body of related data may be in the form of a table, a map, a grid, a packet, a datagram, a file, a document, a list or in any other form.

The term "location" as used herein refers to a position relative to any frame of reference such as a facility, residence, train, aircraft, automobile, or other structure, conveyance, place or thing, whether fixed or in motion, or relative to a coordinate system such as latitude and longitude.

The term "disposition data" as used herein refers to data representing location, change in location, motion, speed, velocity, movement and/or acceleration.

The terms "panelist," "respondent" and "participant" are interchangeably used herein to refer to a person who is, knowingly or unknowingly, participating in a study to gather information, whether by electronic, survey or other means, about that person's behavior or activity or exposure to media and/or publications.

The term "position signal" as used herein means a signal from which a position can be derived, either in absolute or relative terms, with or without the use of additional position signals.

The term "time base data" as used herein encompasses data representing time, whether absolute or relative, and clock data.

In accordance with an aspect of the present invention, a method is provided for producing usage data concerning usage of a publication by a person. The method comprises producing first data by means of a first data producing device in or on a publication, the first data representing usage of the publication by a person; producing time base data by means of a device in or on the publication; and producing usage data representing usage of the publication based on the first data and the time base data In accordance with a further aspect of the present invention, a system is provided for producing data concerning usage of a publication by a person. The system comprises a first data producing device in or on a publication and operative to produce first data representing usage of the publication by a person; a time base data producing device in or on the publication and operative to produce time base data; and a processor operative to produce usage data representing usage of the publication based on the first data and the time base data.

BRIEF DESCRIPTION OF THE DRAWINGS

FIG. 5 is a further schematic illustration of a publication in accordance with certain embodiments.

DETAILED DESCRIPTION OF CERTAIN ADVANTAGEOUS EMBODIMENTS

The present invention pertains to gathering data concerning or relating to publication usage. In the various embodiments described, publications are fitted with one or more electronic devices and external devices are operable to gather useful information about how the fitted publications are utilized. In certain embodiments described below, panelists participating in a publication usage study carry portable monitors that gather information relating to publication usage and the portable monitors thereafter download or otherwise transfer the gathered information to a centralized processor for use in producing useful reports concerning publication usage (e.g., by a market research company). Those reports may embody demographics of the panelists along with the publication usage activity of those panelists. In certain other embodiments, also described below, one or more data collection devices not generally associated with panelists gather information relating to publication usage and thereafter supply the gathered information to a centralized processor for further handling.

Figure 1:
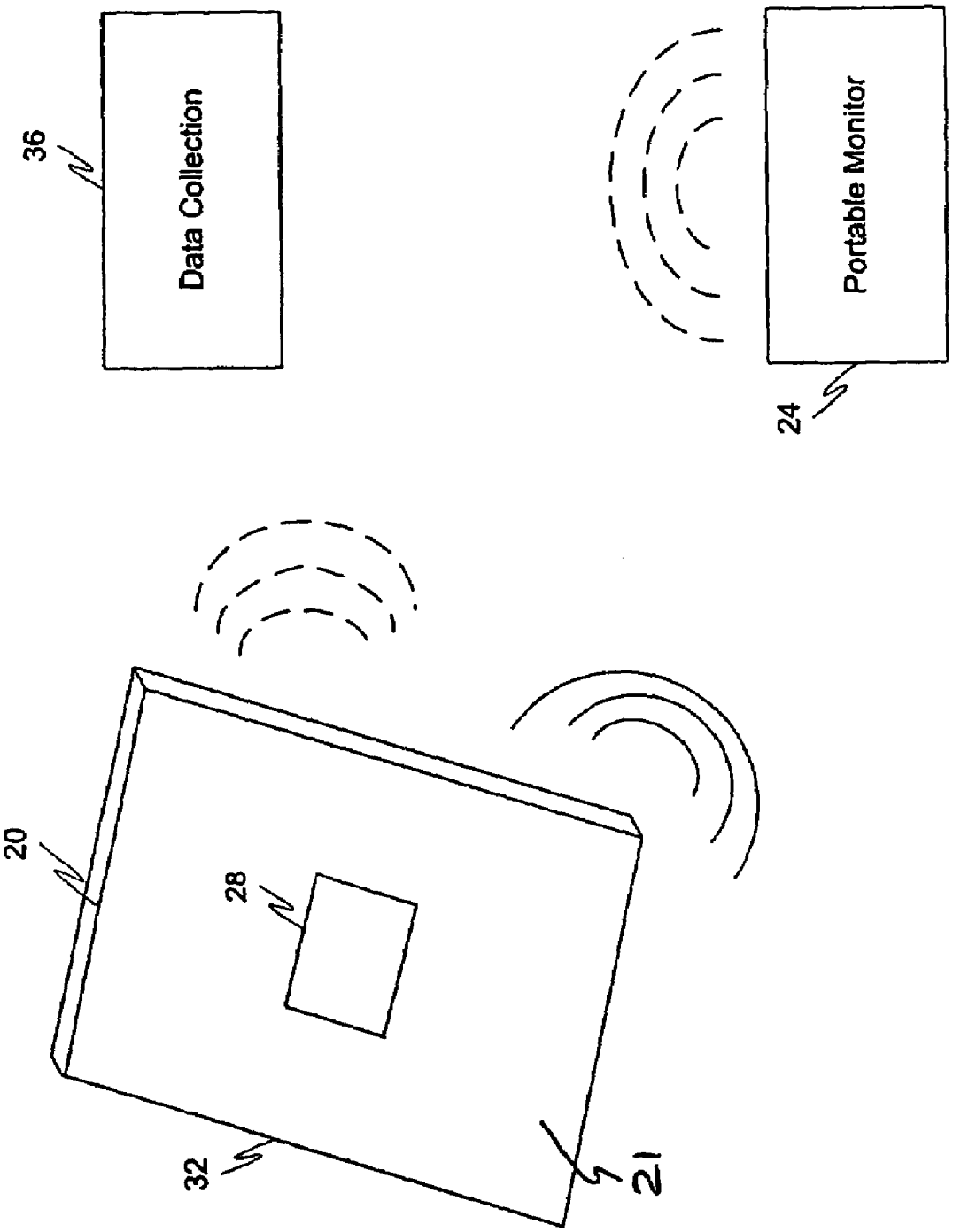
FIG. 1 is a schematic illustration of systems used to gather data in accordance with certain embodiments of the present invention.

Referring now to the drawings, FIG. 1 schematically illustrates several embodiments of systems used to gather data concerning usage of a publication 20 by a participant in a publication usage study. The participant carries a portable monitor 24 on his/her person which is operative to receive and store and/or communicate publication usage data concerning the participant's usage of publication 20. The publication usage data corresponds to or is based on data wirelessly communicated from a wireless transmitter 28 in or on the publication 20.

In certain embodiments, the wireless transmitter 28 is affixed to or carried by a cover 21 of the publication 20, as illustrated in FIG. 1. In certain embodiments, the wireless transmitter 28 is affixed to or carried by or within a binding or spine 32 of the publication 20. In certain embodiments, the wireless transmitter 28 is affixed to or carried by or in a page, card or other internal component of the publication 20. Certain embodiments employ a plurality of wireless transmitters to communicate data to the portable monitor 24.

In certain embodiments, the wireless transmitter 28 is a radio frequency (RF) transmitter operating at one or more frequencies selected in a range up to microwave frequencies. In other embodiments, the wireless transmitter 28 transmits infrared, visible light or acoustic energy.

In certain embodiments, usage data is communicated from wireless transmitter 28 to a data collection device or system 36 instead of or in addition to portable monitor 24. In certain ones of such embodiments, the wireless transmitter 28 communicates with a base station (e.g., system 36) located in a participant's household (e.g., mounted on a wall, placed on a desk, etc.) to convey data pertaining to the publication. In certain other embodiments, the base station is disposed within a commercial establishment, such as book store or library. For these embodiments employing a base station, the base station communicates the conveyed data to a centralized processor (not shown for purposes of simplicity and clarity) in order to enable preparation of reports concerning publication usage. Advantageously, the base station is of the kind disclosed in U.S. Pat. No. 5,483,276 in the names of Brooks, et al., assigned to the assignee of the present application and incorporated herein in its entirety by reference.

For various embodiments employing a portable monitor, the portable monitor transfers the gathered data to the data collection device or system 36, which in turn transfers the data to the above-mentioned (or different) centralized processor to enable preparation of reports concerning publication usage.

Figure 2:
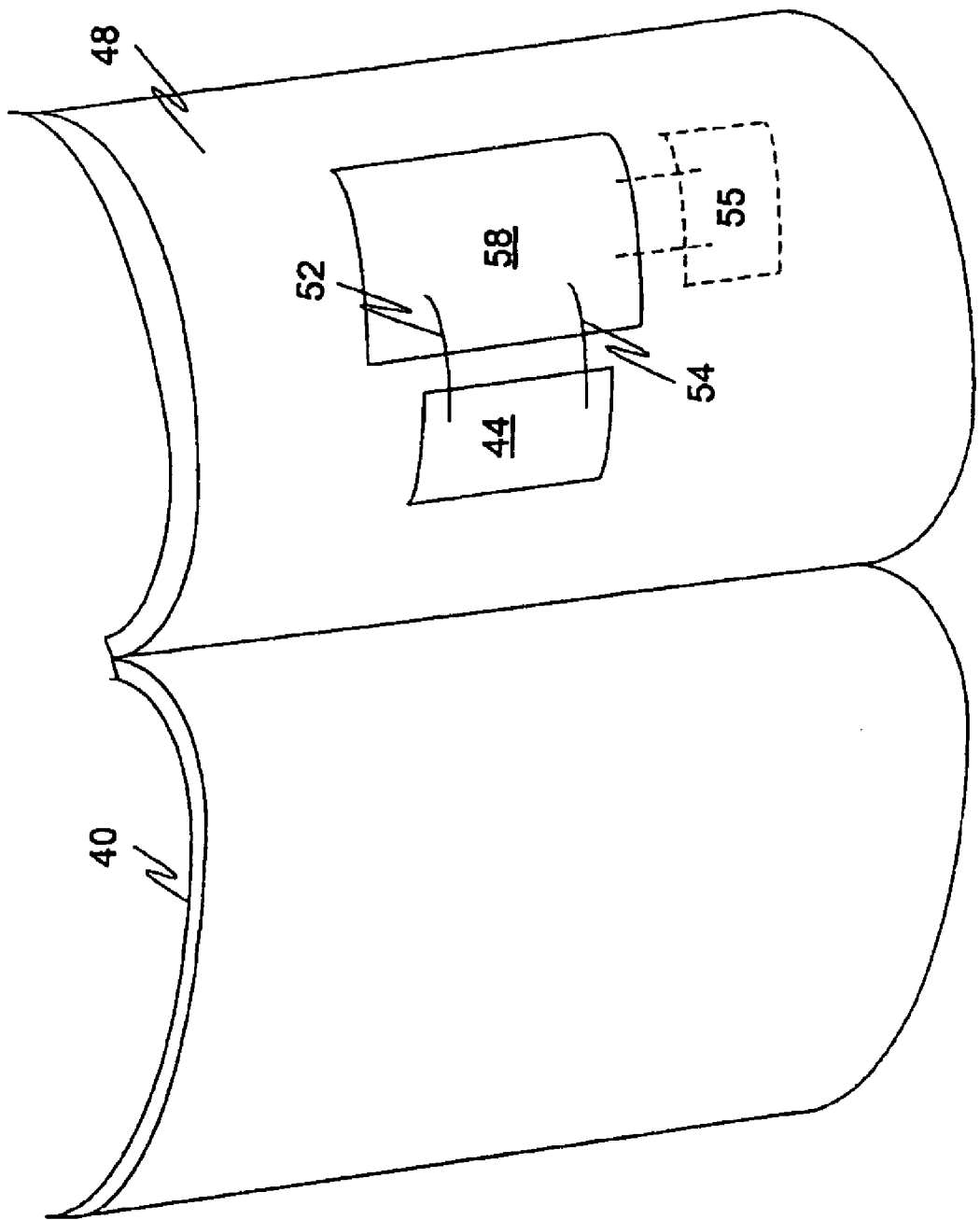
FIG. 2 is a schematic illustration of a publication containing a piezoelectric transducer in accordance with certain embodiments.

FIG. 2 schematically illustrates an embodiment of a publication usage data producing system which serves to produce data concerning usage of a publication 40 by a participant in a publication usage study. In the FIG. 2 embodiment, a piezoelectric transducer 44 is affixed to or carried by a page 48 of the publication 40. When the page 48 of the publication 40 is flexed, as by turning page 48, the piezoelectric transducer 44 is also flexed so that it produces an electrical signal which it provides at leads 52 and 54. Leads 52 and 54 are connected with a wireless transmitter 58 which responds by transmitting a wireless signal containing data based on the output of the piezoelectric transducer 44, for reception by a portable monitor such as monitor 24 of FIG. 1, data collection device 36 or a different data collector.

In certain embodiments, the transducer 44 comprises a piezoelectric polymer film on or in the page 48, so that as page 48 is flexed the film is stressed to produce a corresponding electrical signal supplied by leads 52 and 54 to wireless transmitter 58. Wireless transmitter 58 in certain embodiments processes the signal, for example, to suppress noise. In other embodiments, the wireless transmitter 58 communicates the signal essentially as is to a monitor or data collector. In certain embodiments, the transducer 44 supplies power to enable the transmitter 58 to transmit its wireless signal.

In certain embodiments, multiple pages of a publication are fitted with a transducer 44 and wireless transmitter 58 (for convenience, also called "transducer/transmitter" herein). Each transducer/transmitter is designed to transmit a respectively different signal so that the data collector is able to distinguish between each transmission and to identify the particular page or pages turned. In certain embodiments, only select pages of a publication are fitted with a transducer/transmitter, such as every other page, every third page, etc. In certain embodiments, the first page (alternatively, second page, last page, etc.) of each section of a publication is provided with a transducer/transmitter. In further certain embodiments, multiple pages of a publication are fitted with a respective transducer 44, and each of the transducers is coupled to a single wireless transmitter (e.g., transmitter 58) disposed within the publication. Depending on the particular transducer that is activated, the wireless transmitter transmits data representative of the particular page of the publication that was turned.

A motion detector, such as accelerometer 55, is provided in certain embodiments to detect motion of the publication indicating that it may be in use. The motion detector provides an enable signal to transmitter 58 when the motion detector detects sufficient motion to infer that the publication is in use, and the transmitter 58 is thereupon enabled to transmit its signal. In certain embodiments, the motion detector is used in conjunction with transducer 44 whereby both the transducer and the motion detector must be "activated" to enable transmitter 58 to transmit a signal. In alternative embodiments, transmitter 58 transmits a signal if one or both devices are activated. In certain other embodiments, the motion detector is employed without the transducer.

Figure 3:
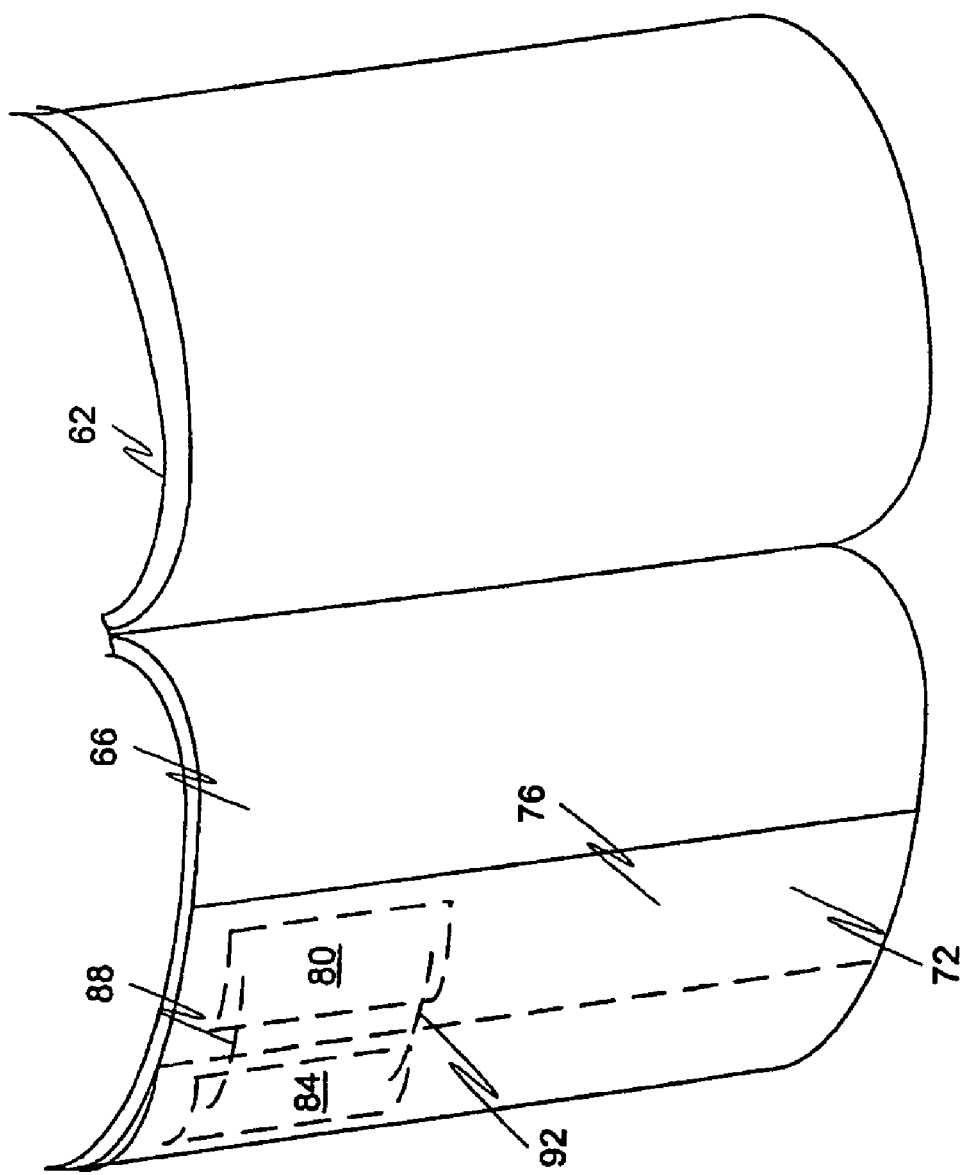
FIG. 3 is a schematic illustration of a publication containing a foldable flap in accordance with certain embodiments.

FIG. 3 provides a schematic illustration of a publication 62 having a page 66 including an outer flap 72 folded back on the sample of a page 66 to conceal content, such as an advertisement, or to contain a fragrance. Flap 72 is affixed to page 66 in a region 76 by a light adhesive which permits the flap 72 to be separated by a reader from the page 66 without damaging either the flap 72 or the page 66. A piezoelectric transducer 80 comprising a piezoelectric element, such as a piezoelectric polymer film, sandwiched between page 66 and region 76 is subjected to stress when flap 72 is separated from page 66. In response to the stress the transducer 80 produces an electrical signal which it provides to a wireless transmitter 84 coupled thereto by leads 88 and 92. Wireless transmitter 84 either processes the signal and transmits it wirelessly or else communicates it substantially as is to a monitor or data collector. In certain embodiments, the transducer 80 supplies power to enable the transmitter 84 to transmit its wireless signal.

Figure 4:
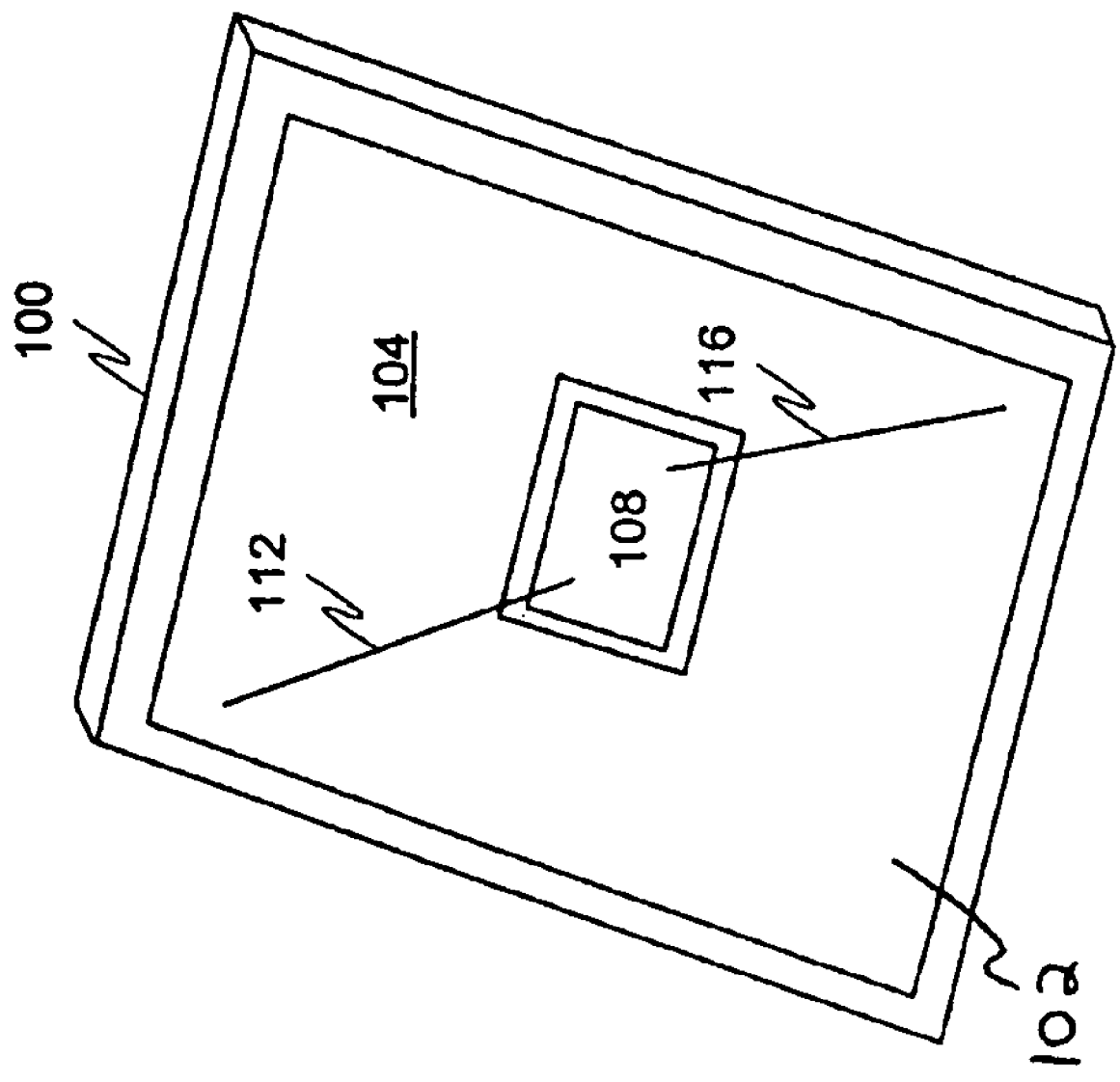
FIG. 4 is a schematic illustration of a publication having a cover on or in which a piezoelectric transducer is placed in accordance with certain embodiments.

FIG. 4 schematically illustrates a publication 100 having a cover 102 on which a piezoelectric transducer is placed to detect that a reader's hand has grasped the publication 100, in order to indicate usage thereof. The piezoelectric transducer comprises a piezoelectric polymer film 104 in or on a substantial portion of the cover of publication 100. In certain embodiments the film 104 is used to detect the stress caused by grasping the publication, while in others it serves to detect a temperature change due to heat from the reader's fingers. In certain embodiments a piezoelectric sensor comprises a ceramic element.

In certain advantageous embodiments, the film 104 is used to detect both stress and body heat in order to improve the likelihood of correctly detecting grasping of the publication by a user. Since the electrical signal produced by the film in response to body heat differs from that produced due to the stress of grasping the publication, the two effects can be separately detected, for example, based on the frequency content of the signal produced by the film 104.

The film 104 is coupled with a wireless transmitter 108 via leads 112 and 116 to supply its electrical signal thereto. In certain embodiments, the leads 112 and 116 comprise electrically conductive media, such as conductive ink, disposed on the cover. In certain embodiments, transmitter 108 processes the signal, for example, to reduce noise or else to detect components therein indicating stress and/or temperature change. The transmitter 108 either wirelessly transmits the processed signal to a monitor or other data collector, or transmits the signal received from the transducer substantially unchanged. In certain embodiments, the film 104 supplies power to enable the transmitter 108 to transmit its wireless signal.

In certain embodiments, a proximity sensor, such as film 104, is designed to detect the proximity of a person in the vicinity of the publication. In certain embodiments, proximity is detected by electric field effects that are produced by a person's body. In certain embodiments, proximity is detected through alteration of an electric characteristic of the sensor. In yet other embodiments, proximity is detected based on thermal energy received by the transducer in or on the publication. In certain embodiments, the piezoelectric polymer film detects body heat due to the presence of a person, with or without detecting grasping of the publication by the person. In each of these embodiments, the transmitter wirelessly transmits data indicative of the particular activity by the person.

Figure 4A:
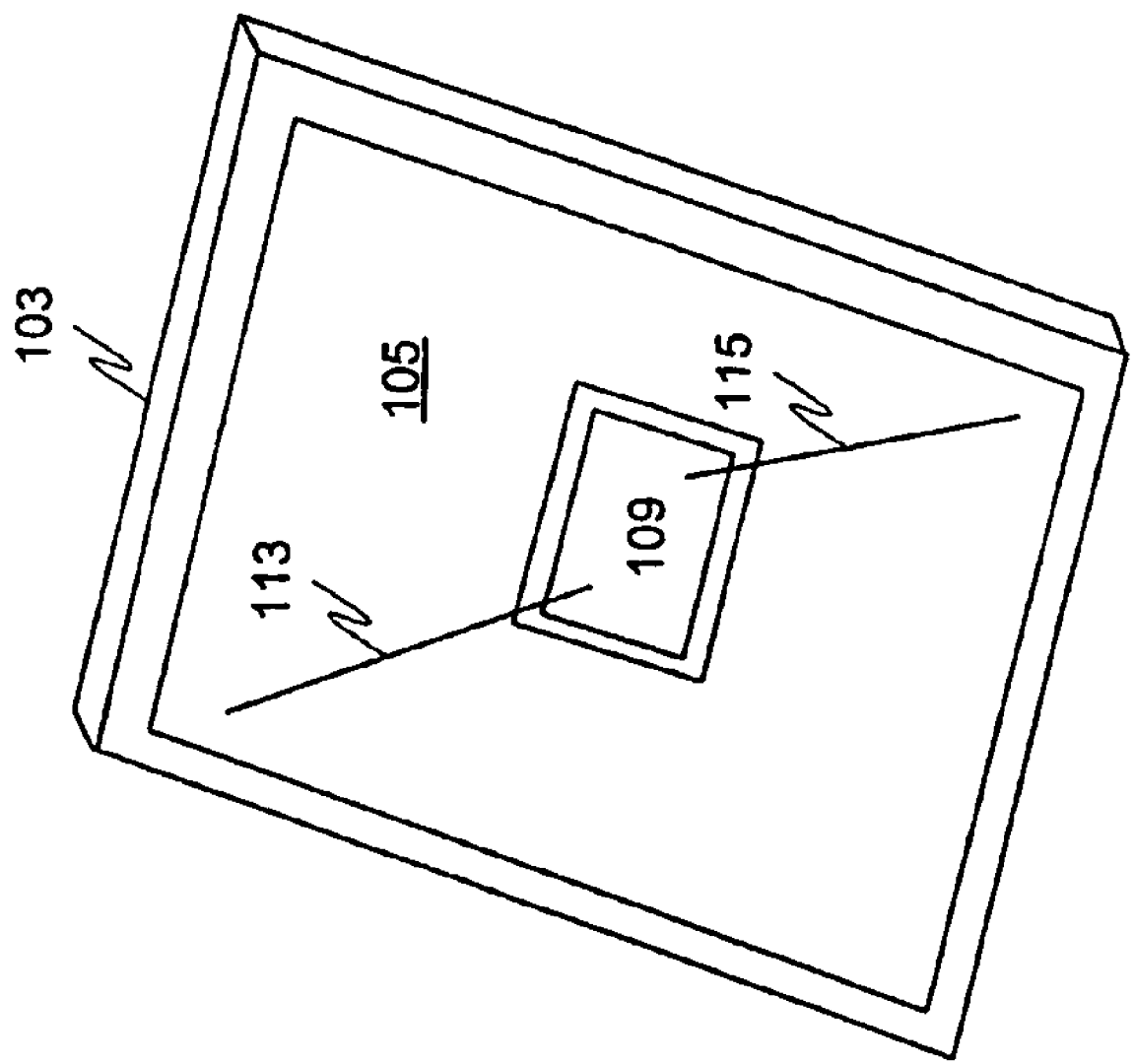
FIG. 4a is another schematic illustration of a publication having a piezoelectric transducer in accordance with certain embodiments.

FIG. 4A schematically illustrates a package 103 containing a publication (not shown for purposes of simplicity and clarity) on which a piezoelectric transducer 105 is placed. The piezoelectric transducer 105 comprises a piezoelectric polymer film in or on the package 103. The film detects the stress resulting from removing the package 103 from the publication.

The transducer 105 is coupled with a wireless transmitter 109 via leads 113 and 115 to supply its electrical signal thereto. In certain embodiments, the leads 113 and 115 comprise electrically conductive media, such as conductive ink, disposed on the cover. In certain embodiments, transmitter 109 processes the signal, for example, to reduce noise or else to detect components therein indicating stress and/or temperature change. The transmitter 109 either wirelessly transmits the processed signal to a monitor or other data collector, or transmits the signal received from the transducer substantially unchanged. In certain embodiments, the transducer 105 supplies power to enable the transmitter 109 to transmit its wireless signal.

FIG. 5 schematically illustrates a publication 120 open at a page 122. A wireless transmitter 124 is disposed in or on the page 122 and is operative to transmit a signal wirelessly indicating usage of the publication by opening it at page 122. A page 126 of publication 120 faces page 122. A device 128 is disposed in or on page 126 and positioned so that it is brought sufficiently close to wireless transmitter 124 when pages 122 and 124 are closed against one another. In this position, device 128 interacts wirelessly with transmitter 124 to establish a first state of transmitter 124. When pages 122 and 126 are separated from one another upon opening the publication between these pages, a second state of transmitter 124 is established. In certain embodiments, transmitter 124 is maintained in a non-transmit mode when in its first state, but switches to a transmit mode when in its second state. In such embodiments, a portable monitor or other data collector receives a transmission from transmitter 124 as an indication that the publication 120 is open at page 122 and/or page 126. In other embodiments, transmitter 124 transmits different data in its two modes so that the portable monitor or other data collector can determine whether the publication 120 has been opened at pages 122 and 126.

In certain embodiments, a motion detector, such as an accelerometer 125, is included in or on the publication to detect motion of the publication. The motion detector is coupled with the transmitter 124 to provide an enabling signal thereto when sufficient motion of the publication is detected to indicate that it may be in use. Upon receipt of such enabling signal, transmitter 124 is enabled to transmit.

In certain embodiments, wireless transmitter 124 comprises an RFID tag having an antenna circuit wirelessly coupled with the device 128 when pages 122 and 126 are closed on one another. In various ones of such embodiments the device 128 comprises a circuit coupled with the antenna circuit of transmitter 124 to detune it when in close proximity. In other such embodiments, device 128 acts as an RF shield to attenuate RF energy received by or transmitted from the transmitter 124. Device 128 in various embodiments is formed by printing or placing one or more layers of conductive inks, foils or other conductive materials on the page 126. These techniques enable various circuit components, such as inductors and capacitors, to be produced on the publication by depositing one or more layers of conductive materials with insulating layers, as appropriate.

Figure 5A:
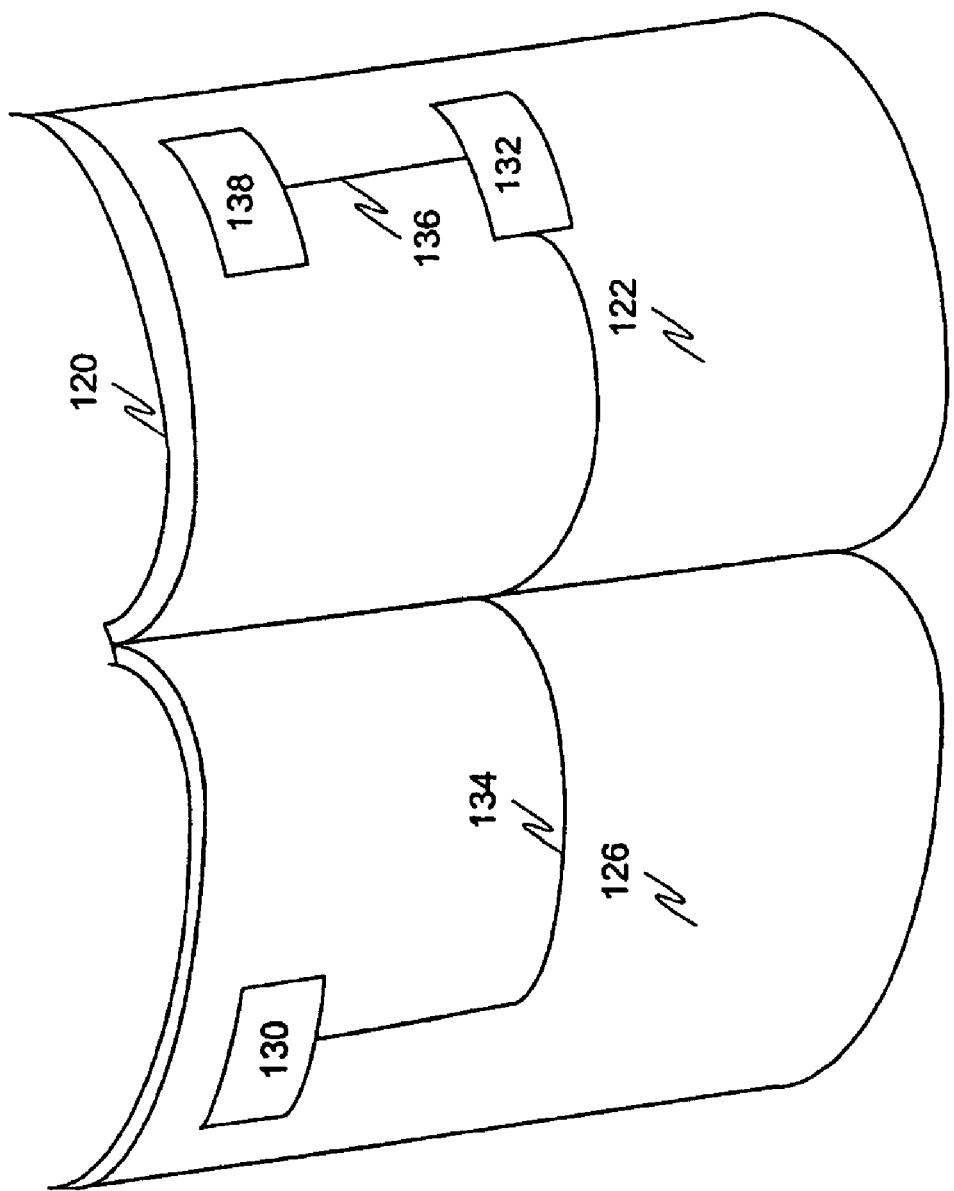
FIG. 5a is yet another schematic illustration of a publication in accordance with certain embodiments.

FIG. 5A schematically illustrates a variant of the embodiments of FIG. 5, wherein corresponding elements have the same reference numerals. In the embodiment of FIG. 5A a wireless transmitter 132 is coupled with a first device 130 on page 126 via lead 134 and with a second device 138 on page 122 via lead 136. Devices 130 and 138 are positioned on their respective pages so that when pages 122 and 126 are closed on one another, devices 130 and 138 are coupled with one another wirelessly to establish a first state of transmitter 132, while when pages 126 and 122 are opened sufficiently, devices 130 and 138 become decoupled to establish a second state of transmitter 132. The two states of transmitter 132 are used in the same manner as in the embodiment of FIG. 5 to determine whether the publication 120 has been opened at pages 122 and 126.

In certain embodiments, devices 130 and 138 are conductive patterns establishing a capacitive coupling when pages 122 and 126 are closed. In certain embodiments, devices 130 and 138 form respective inductors inductively coupled with one another when pages 122 and 126 are closed.

Figure 6:
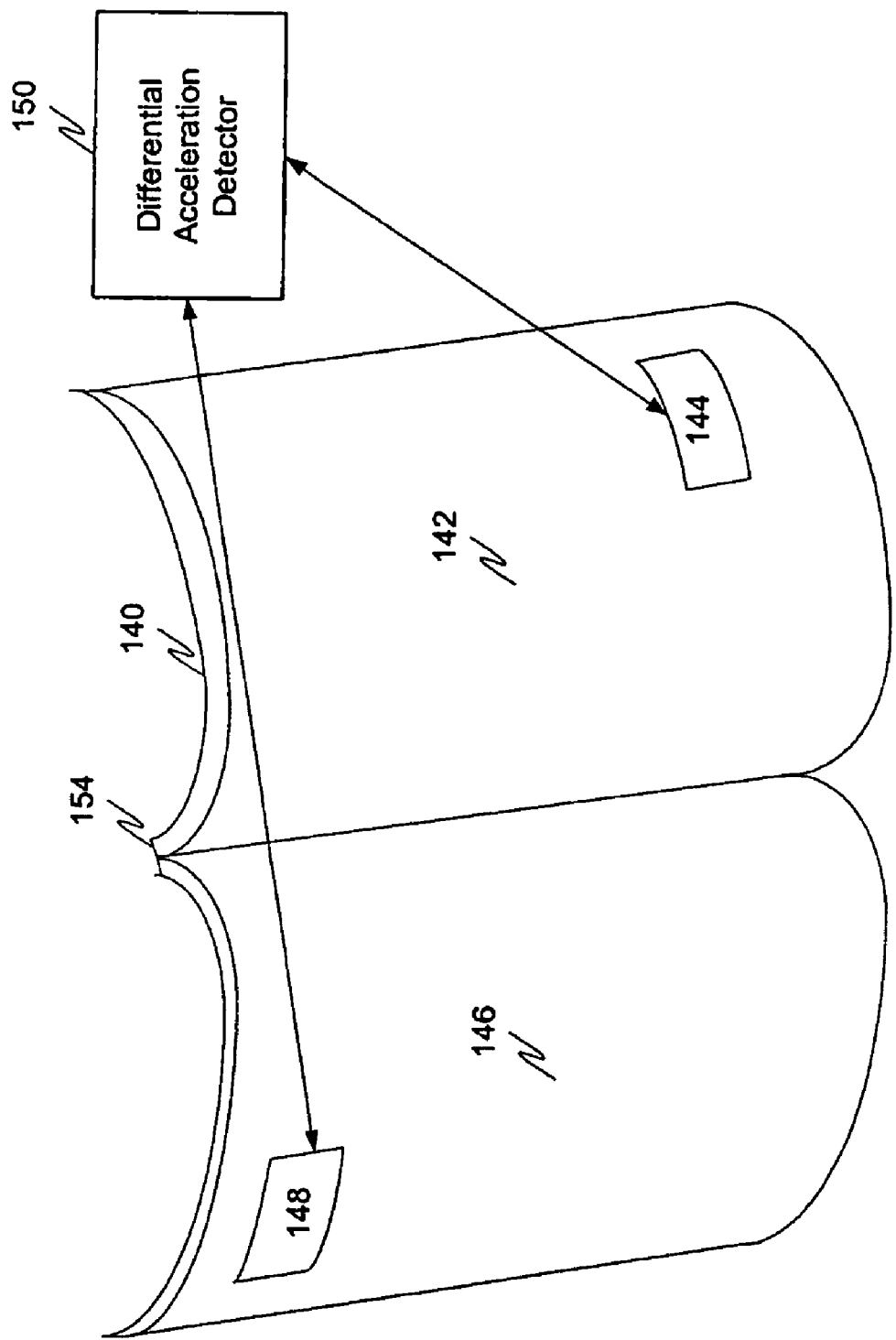
FIG. 6 is a schematic illustration of a publication having acceleration detectors in accordance with certain embodiments.

FIG. 6 schematically illustrates a publication 140 open at first and second pages 142 and 146. A first acceleration detector 144 is positioned in or on first page 142, while a second acceleration detector is positioned in or on second page 146. A differential acceleration detector 150 is coupled with each of acceleration detectors 144 and 148 to detect a difference between their output signals in order to determine that the pages have been moved relative to one another, indicating that pages 142 and 146 have either been opened or closed by the reader. In certain embodiments, the differential acceleration detector 150 is positioned in or on the publication 140, and either incorporates a wireless transmitter to communicate detected data to a portable monitor or other data collector or is coupled with a separate wireless transmitter for this purpose. In other embodiments, the differential acceleration detector is incorporated in the portable monitor or other data collector, and the outputs of detectors 144 and 148 are wirelessly transmitted thereto by one or more wireless transmitters in or on publication 140.

In certain embodiments, both acceleration detectors 144 and 148 are positioned on the same page but at differing distances from a binding 154 of the publication 140. In certain embodiments, one of the acceleration detectors is positioned in or one the binding 154 or in or on a cover of the publication 140.

Figure 7:
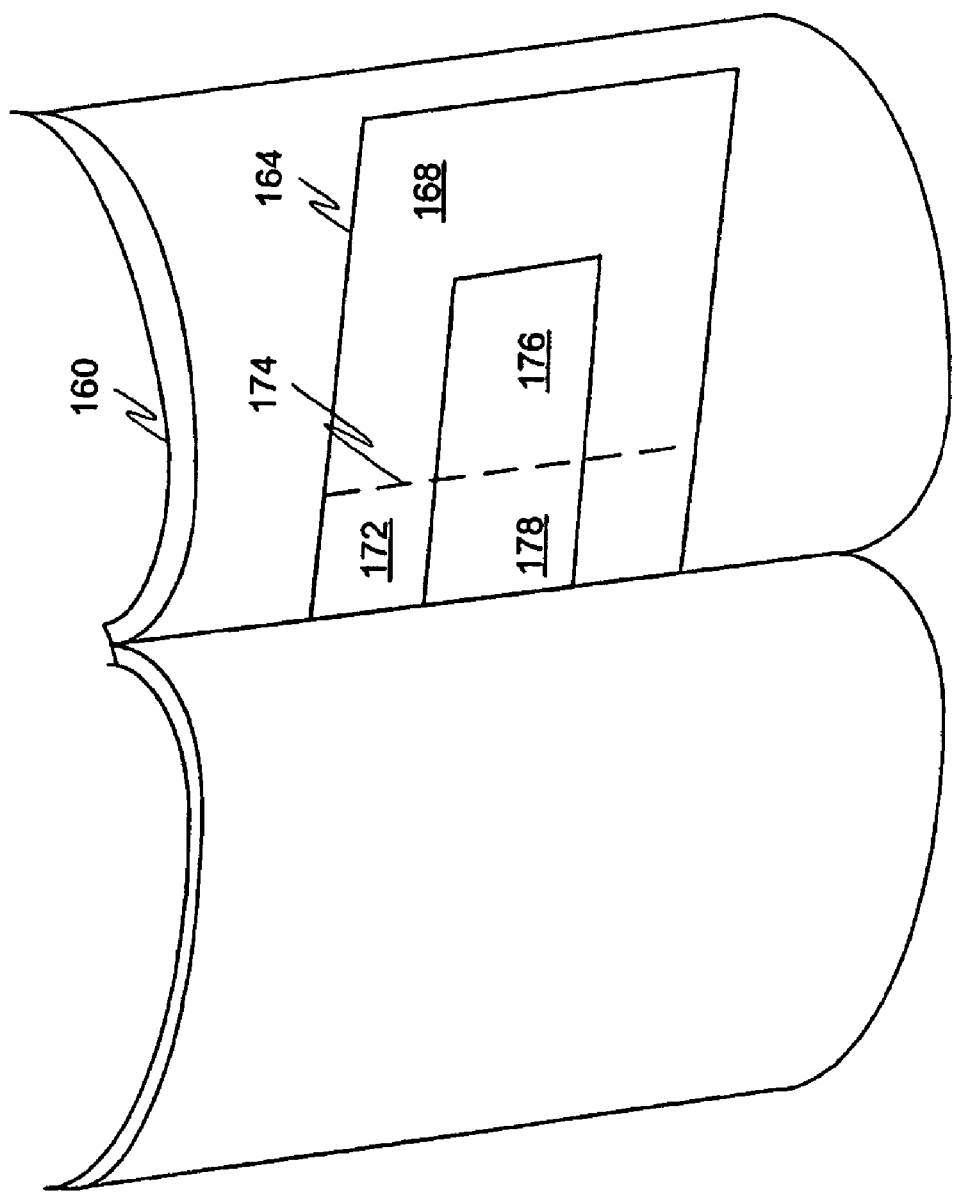
FIG. 7 is a schematic illustration of a publication having a detachable card insert in accordance with certain embodiments.

FIG. 7 schematically illustrates a publication 160 having a card insert 164 affixed between two pages of the publication 160 and having a first portion 168 detachably affixed to a second portion 172 permanently affixed to the publication. First portion 168 of card insert 164 may be detached from second portion 172 along a perforated or otherwise weakened portion 174 by a publication user and used to submit an inquiry by mail or other physical delivery regarding a product or service, or to otherwise provide or request information from another.

A wireless transmitter 176 is disposed in or on the removable first portion 168 and is coupled with a device 178 in or on the second portion 172 so long as the first and second portions remain attached. Once the reader detaches the first portion 168 from the second portion 172, the device 178 is uncoupled from the wireless transmitter 176. The wireless transmitter 176 has a first state which is maintained so long as the first and second portions are attached and device 178 is thus coupled with wireless transmitter 176, and a second state established upon separation of the first and second portions and the consequent uncoupling of device 178 from wireless transmitter 176. In certain embodiments, transmitter 176 is maintained in an inactive mode when in its first state, but switches to an active mode when in its second state. In such embodiments, a portable monitor or other data collector receives a transmission from transmitter 176 as an indication that the first portion 168 has been removed from the publication 160. In certain other embodiments, transmitter 176 transmits in its first state and ceases transmitting when it switches to its second state. In certain embodiments, transmitter 176 transmits different data in its two states so that the portable monitor or other data collector can determine whether the first portion 168 has been removed from the publication 160

In certain embodiments, device 178 is conductively coupled with transmitter 176, such that upon separation of portions 168 and 172 this connection is broken. In certain ones of such embodiments, device 178 is a jumper maintaining a connection between two points in a control circuit of transmitter 176. In certain ones of such embodiments, device 178 constitutes a control circuit. In certain embodiments, device 178 is an electromagnetic deflector. In certain other embodiments, device 178 is a destructive interference circuit. In certain other embodiments, device 178 is an attenuation circuit. In certain other embodiments, device 178 is a detuning circuit.

In certain embodiments, the wireless transmitter 176 is positioned in or on portion 172, while the device 178 is positioned in or on portion 168.

Figure 8:
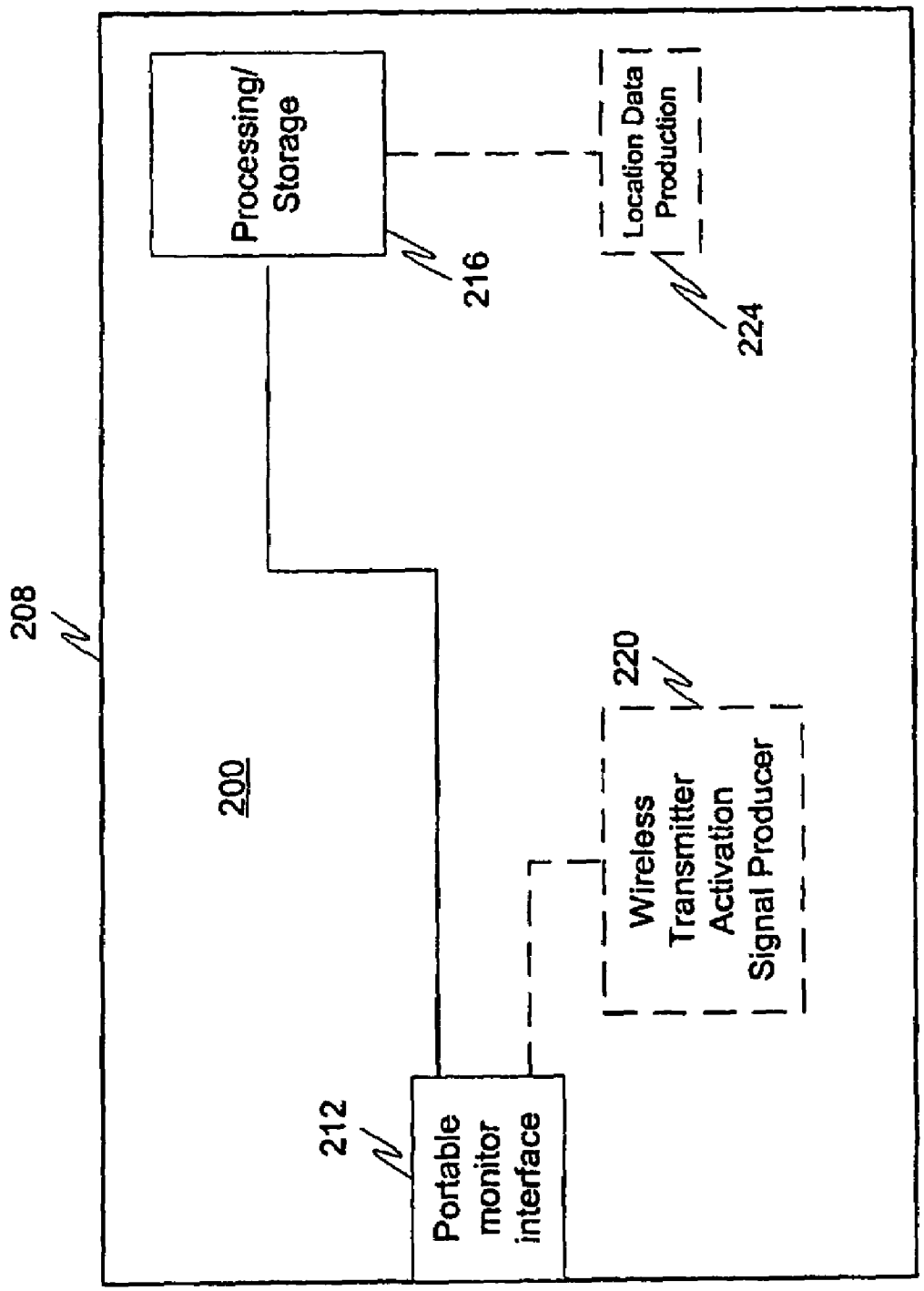
FIG. 8 is a functional block diagram of a portable monitor used with certain embodiments.

FIG. 8 schematically illustrates a portable monitor 200 having an enclosure 208 having a size and shape selected so that portable monitor 200 may be carried on the person of a participant in a publication usage study. Portable monitor 200 comprises a portable monitor interface 212 for communicating data to and from the monitor 200. The interface 212 includes a wireless receiver (not shown for purposes of simplicity and clarity) operative to receive wireless transmissions from wireless transmitters in or on publications, such as one or more of transmitters 28, 58, 84, 124, 132 and 176. The portable monitor 200 stores the received data or data based thereon at 216 for later downloading via interface 212 (or other interface) to a centralized processor (not shown for purposes of simplicity and clarity), or communicates such data without prior storage, for producing reports concerning usage of publications.

In certain embodiments, monitor 200 includes circuitry 220 which produces an activation signal which is wirelessly transmitted by the interface 212 to one or more wireless transceivers in a publication to activate them to transmit data. In certain ones of such embodiments, circuitry 220 and interface 212 collectively operate as an RFID tag reader. Since RFID technology and RFID tag readers are well known in the art, further description of their design and operation are not provided herein.

In certain embodiments, the monitor 200 includes circuitry 224 for producing location data indicating a location of the participant carrying the portable monitor 200. Such location data is produced in various embodiments by means of a GPS receiver, an assisted GPS receiver, an inertial monitoring unit or a wireless location signal receiver which receives short range location signals containing data indicating locations of their respective transmitters. In certain embodiments, the signals used for this purpose are obtained from a cellular telephone system, Wi-Fi access points, Bluetooth device or a TV-GPS receiver, such as the TV-GPS devices developed by Rosum Corporation.

The portable monitor 200 receives the location data at 216 for use in confirming publication usage data received by the interface 212. For example, if the location data indicates that the participant is walking or running along a sidewalk, a road or within a park, such location data implies that the participant is probably not reading a publication whose data is then received by the monitor 200. However, if the location data indicates that the participant is home or on a train, this location data implies that the participant may well be reading a publication, and thus tends to confirm the validity of publication usage data received by the monitor 200 at that time. In certain embodiments, monitor 200 confirms the accuracy of the received publication usage data. In certain other embodiments, monitor 200 stores the location data along with the publication usage data, for later downloading to a centralized processor. The centralized processor thereafter confirms or verifies the accuracy of the publication usage data utilizing the location data. In certain embodiments, both time and location information is stored in monitor 200, with each publication usage data, for later handling by the centralized processor.

Figure 9:
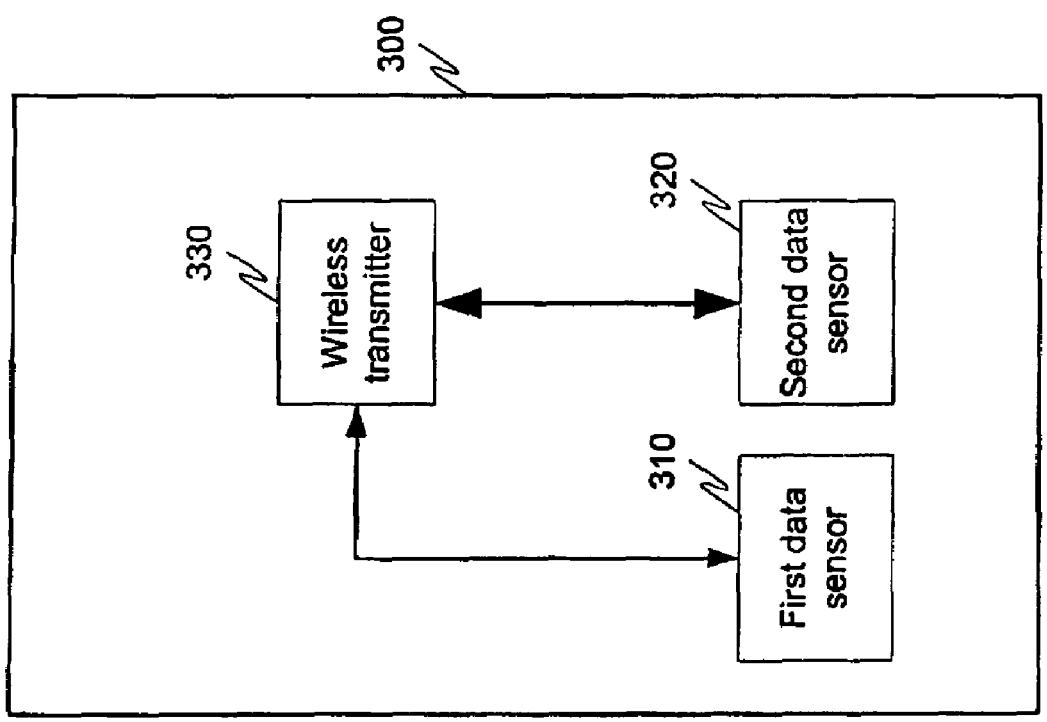
FIG. 9 is a functional block diagram showing data sensors and a wireless transmitter used with a publication in accordance with certain embodiments.

FIG. 9 schematically illustrates a publication 300 having a first data sensor 310 and a second data sensor 320 therein or thereon. First sensor 310 senses a selected one of translational movement, deformation, grasping, proximity of the publication to a person and exposure of the publication. Second data sensor 320 senses one of translational movement, deformation, grasping, proximity of the publication to a person and exposure of the publication, other than the event or condition sensed by the first data sensor 310. The first and second data sensors are coupled with a wireless transmitter 330 to communicate the data sensed by the first and second data sensors to a portable monitor or other data collection system. In certain embodiments, transmitter 330 processes the received data, for example, to reduce noise or else to detect components therein indicating an event or condition being sensed. The transmitter 330 either wirelessly transmits the processed signal to a monitor or other data collector, or transmits the signal received from the transducer substantially unchanged. In certain embodiments, wireless transmitter 330 transmits or is enabled to transmit usage data when the characteristic sensed by the first data sensor 310 (or the second data sensor 320) falls within a predetermined range. In certain embodiments, wireless transmitter 330 transmits or is enabled to transmit usage data when the both the respective characteristics sensed by the first and second data sensors 310 and 320 falls within respective predetermined ranges. In certain ones of these embodiments, the same interval of time is utilized for sensing by both the first and second data sensors 310 and 320. In other embodiments, different intervals of time are utilized.

Figure 10:
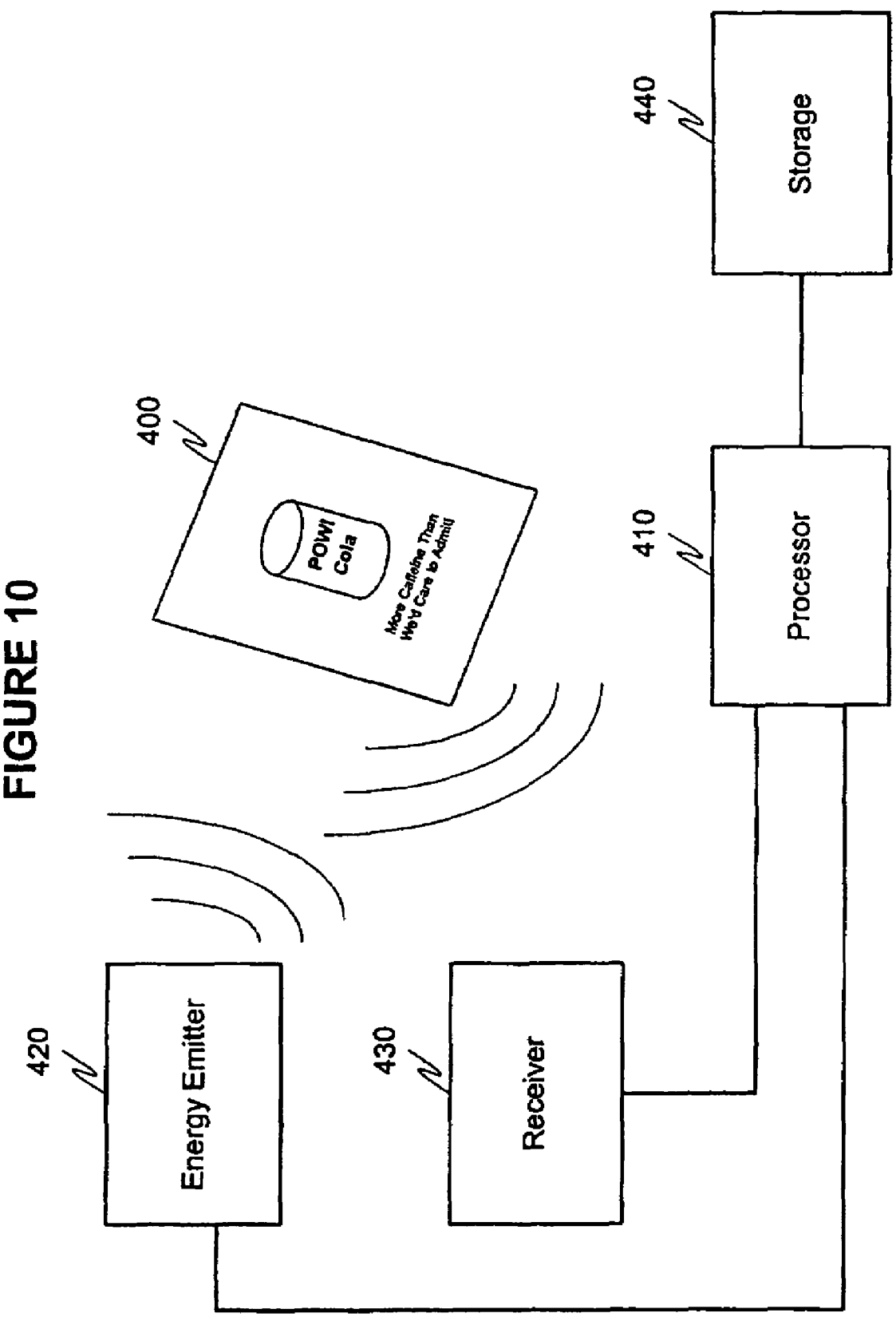
FIG. 10 is a schematic illustration of systems used to produce a signature in accordance with certain embodiments.

FIG. 10 schematically illustrates a system for producing a signature representing a publication or a portion 400 thereof. The signature serves to identify the publication or its portion, such as an advertisement in a publication. In FIG. 10, portion 400 comprises an advertisement for a fictional product, POW! Cola. In certain embodiments the publication or a portion thereof is printed in conductive ink and an energy emitter 420 of the system of FIG. 10 emits RF or other electromagnetic energy toward the publication 400, under the control of a processor 410. The conductive image on the publication 400 reacts to the received energy to reflect portions thereof and/or store, modify and retransmit portions thereof to a receiver 430. Receiver 430 provides its received data, including data representing energy received from the publication 400, to processor 410 which analyzes such data to extract portions thereof based on frequency, amplitude, phase or other signal characteristics and produce a set of data therefrom which characterizes the publication or portion thereof that was exposed to the electromagnetic energy. This set of data is stored in storage 440 along with associated data identifying the publication or portion thereof or otherwise characterizing one or the other.

Figure 11:
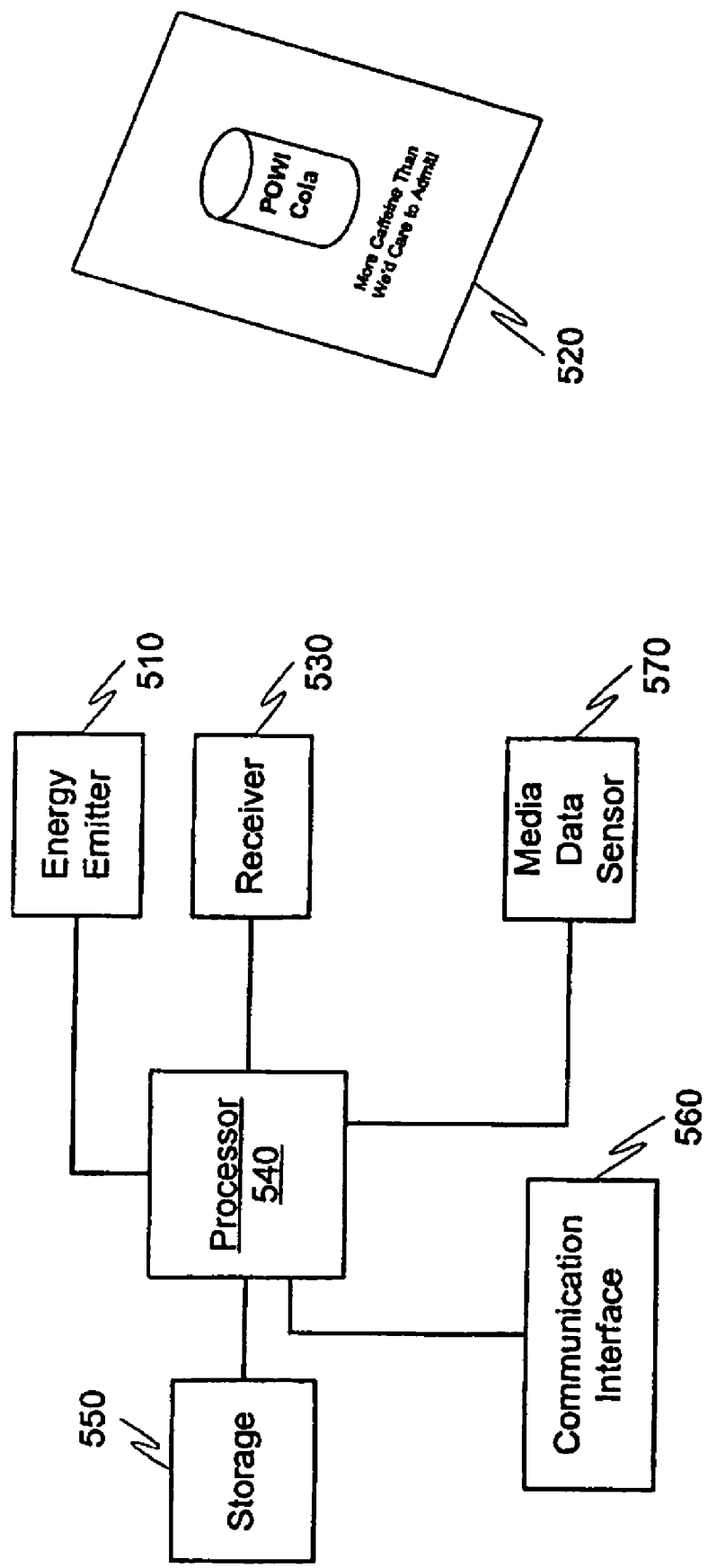
FIG. 11 is another schematic illustration of systems in accordance with certain embodiments.

In this manner, a library of signatures identifying or characterizing publications or portions thereof, such as advertisements, is created. With reference to FIG. 11, in conducting a publication usage study, participants are provided with portable monitors, such as monitor 500 shown schematically in block diagram format. Monitor 500 includes an energy emitter 510 which emits energy of the same kind as the system of FIG. 10 in order to cause a publication or portion thereof 520 to reflect or transmit energy to a receiver 530 in the monitor 500. A processor 540 in monitor 500 extracts a signature in the same manner as processor 410 of FIG. 10 and either stores the same for later processing in storage 550, or else attempts to match it with a reference signature in the library of reference signatures representing publications and portions of publications developed by the system of FIG. 10 and stored in storage 550. When such a match occurs, it is determined that the participant carrying the portable monitor which gathered the signature, was exposed to the publication or portion thereof. When such a match occurs, the data associated with the reference signature is stored in storage 550 with or without an indication of the participant for producing reports concerning usage thereof. A communication interface 560 is provided in monitor 500 to either communicate signatures gathered by monitor 500 to a centralized processor for matching with reference signatures, or else to communicate match data for use in producing reports on publication usage.

With reference again to FIG. 11, the monitor 500 also includes a media data sensor 570 which serves to collect data concerning exposure of the participant to media data. In certain embodiments, the media data sensor 570 comprises a microphone to pick up audio media data which it supplies to the processor 540 for producing data concerning exposure of the participant to audio media data and associated other data, such as video data. In certain embodiments, the sensor 570 comprises a light detector to pick up remote control signals indicating selection of a channel or other source of media data. In certain embodiments, sensor 570 is an RF receiver that picks up RF energy indicating media data selected for exposure to the participant. In each case, processor 540 produces media data exposure data which it stores in storage 550 to provide records of media data to which the participant was exposed. Preferably, both the publication usage data and media data exposure data are stored along with a time stamp indicating times of usage or exposure, as appropriate. The time stamp is obtained from a single clock (not shown for purposes of simplicity and clarity) so that the time stamps are all provided on the same time base. In certain embodiments, monitor 500 includes circuitry for receiving position signals so that the location of monitor 500 can be identified and associated with the data stored in storage 550.

Figure 12:
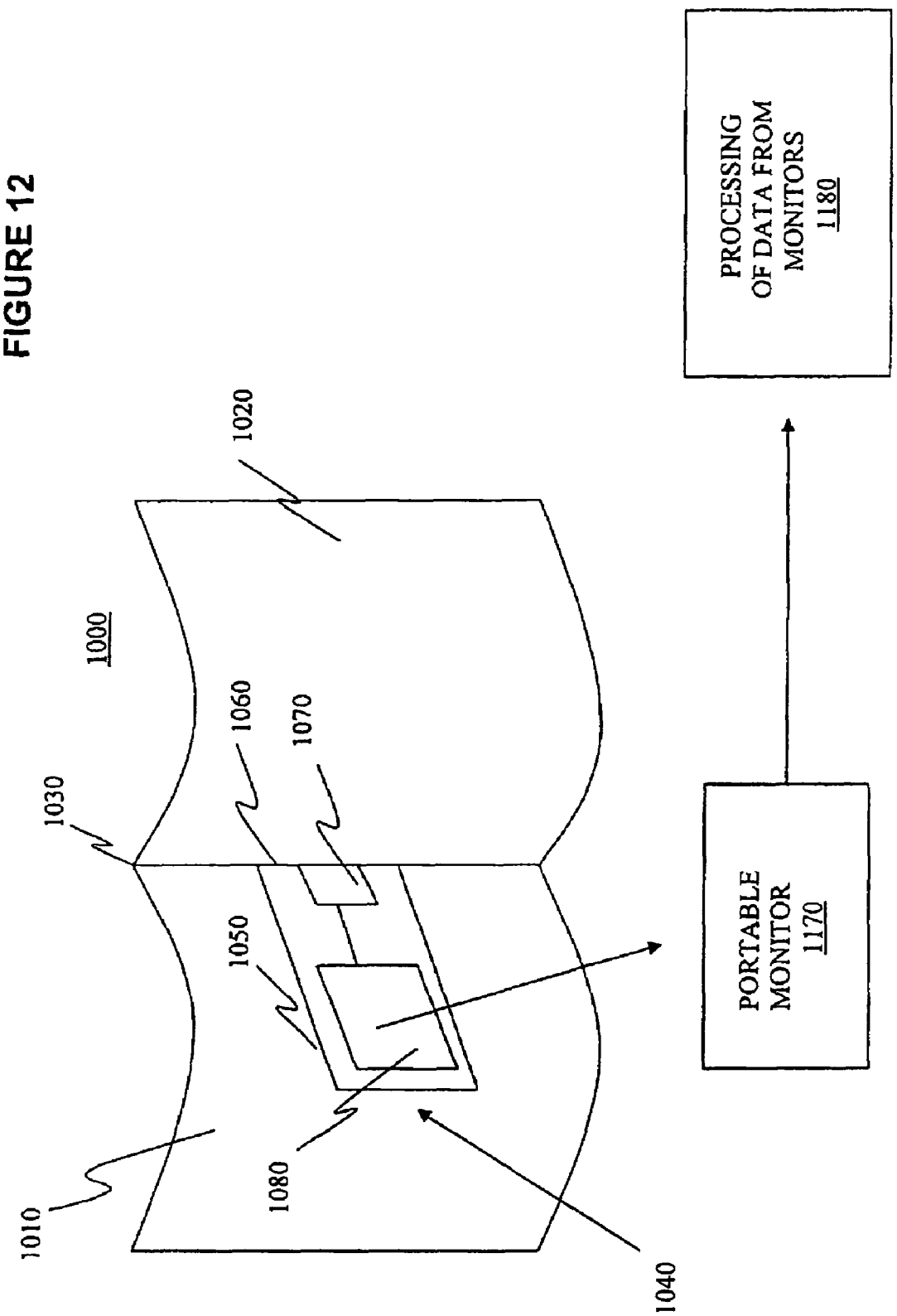
FIG. 12 is a further schematic illustration of systems in accordance with certain embodiments.

FIG. 12 illustrates an embodiment of a system for gathering data concerning usage of an exemplary publication 1000 by a person. The publication 1000 includes two or more pages, of which pages 1010 and 1020 are illustrated in FIG. 12. The pages of the publication are joined at a spine 1030 of the publication, whether by an adhesive, a fastener or fasteners, thread or otherwise.

A data gathering system 1040 is included in the publication 1000 and includes a substrate 1050 having an inner portion 1060 joined to the publication 1000 at the binding 1030. The system 1040 further includes a piezoelectric transducer 1070 in or on the substrate 1050 and having at least a portion within or joined to the spine 1030 of the publication 1000. Forces experienced by the spine 1030 will thus be experienced by the piezoelectric transducer 1070, so that it will produce electrical energy characterizing such forces. In certain embodiments, piezoelectric transducer 1070 comprises one or more layers, such as piezoelectric polymer or ceramic material, printed on substrate 1050.

The transducer 1070 is coupled with a main module 1080 of the system 1040 to supply transducer output data thereto.

Figure 13:
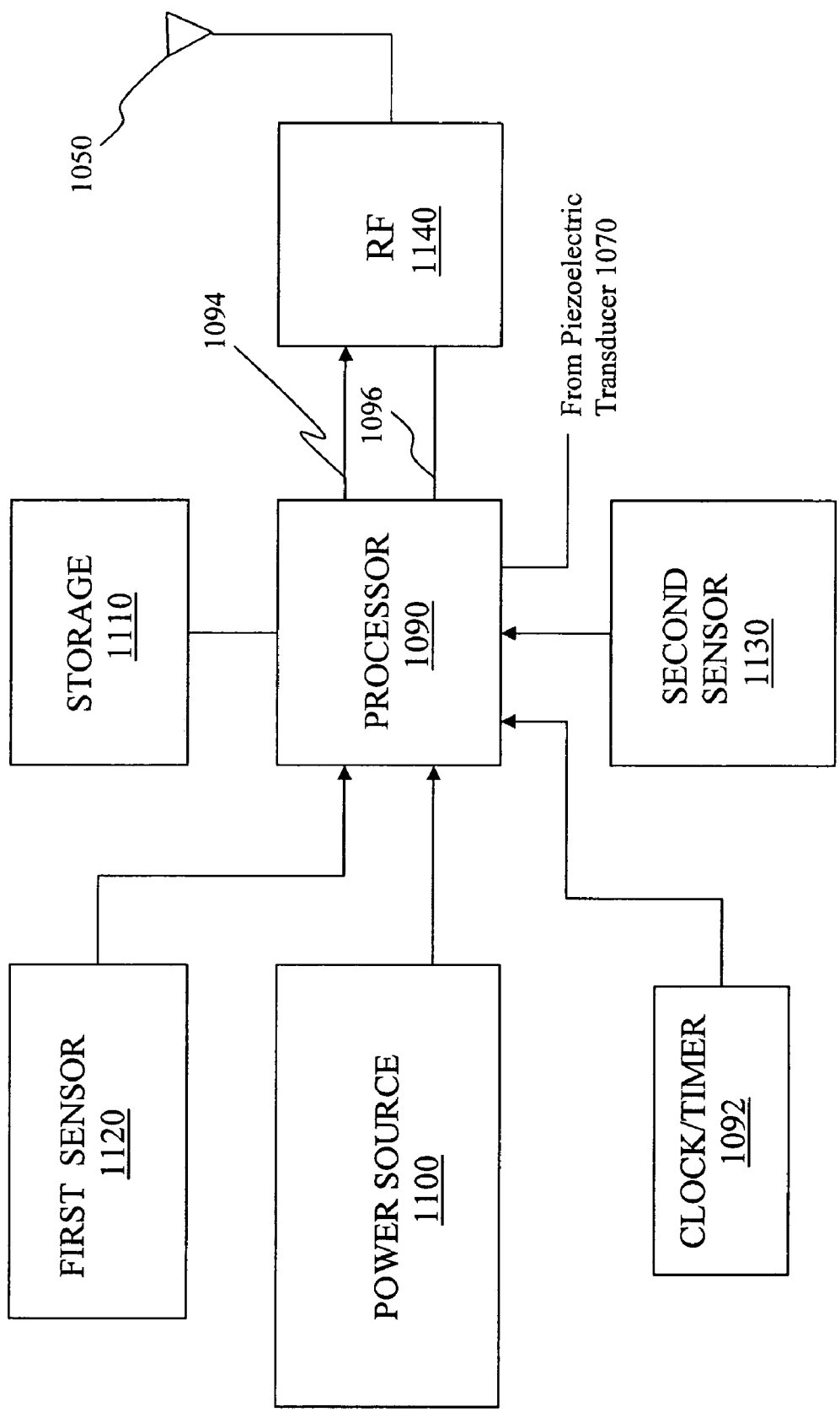
FIG. 13 is a functional block diagram of a main module in accordance with certain embodiments.

In certain embodiments, the transducer output data is input to main module 1080 as electrical energy, as a signal with or without energy transfer, and/or as an input to control a switch or other input device. A partially schematic diagram of the main module 1080 is illustrated in FIG. 13, which includes a processor 1090, a power source 1100 coupled with the processor 1090 to supply power thereto for operating the system 1040, a storage 1110 coupled with the processor to supply stored data to the processor 1090 and/or to store data provided thereby, a clock/timer circuit 1092 coupled with processor 1090, a first sensor 1120 and a second sensor 1130 each coupled with the processor 1090 to supply data thereto associated with usage of the publication 1000 by a person, an RF module 1140 coupled with processor 1090 to receive power therefrom over a line 1094 and to input to and/or output data from, processor 1090 over a line 1096, and an antenna 1150 coupled with RF module 1140 to radiate and/or receive RF energy from or to, RF module 1140. Processor 1090 also has an input 1160 coupled with piezoelectric transducer 1070 to receive its output.

Substrate 1050 comprises one or more sheets of suitable material such as paper, plastic, cloth or other material. In certain embodiments, power source 1100 comprises a printable cell or cells, or a thin film cell or cells, either printed on substrate 1050 or preassembled and adhesively affixed thereto. In certain embodiments, processor 1090 and storage 1110 comprise flip chip components having matching terminals enabling them to be placed one over the other and interconnected. In certain embodiments, RF module 1140 comprises a transmitter to transmit data wirelessly from the system 1040, while in certain embodiments, RF module 1140 comprises a transceiver for transmitting data as well as for receiving data, such as control data and/or programming data.

In certain embodiments, first sensor 1120 comprises a disposition data sensor operative to provide output data representing disposition data of the system 1040, and therefore, of the publication 1000. In certain ones of such embodiments, first sensor 1120 comprises an accelerometer and/or a motion sensor. In certain embodiments, second sensor 1130 comprises a photosensor operative to provide output data representing exposure of the sensor to light. In certain embodiments, depending on the nature of sensors 1120 and 1130, processor 1090 supplies power to one or both, as needed via connections thereto (not shown for purposes of simplicity and clarity). In certain embodiments, the components are interconnected on substrate 1050 by means of patterns of conductive ink printed on the substrate.

The clock/timer circuit 1092, in certain embodiments, is separate from the processor 1090, while in others it is internal to processor 1090. In certain embodiments, clock/timer circuit 1092 supplies clock pulses for synchronizing the operations of processor 1090. In certain embodiments, clock/timer circuit 1092 provides time data, reflecting either a relative time or real time. In certain ones of such embodiments, the time stamp is stored with sensor data or processed data derived from sensor data in storage 1110 to provide a time base for evaluating such data, in system 1040 and/or in a processor exterior to system 1040. In certain ones of the foregoing embodiments, the clock pulses and/or time data are used by the processor 1090 to evaluate raw data from one or more of sensors 1120 and 1130 and piezoelectric transducer 1070 in order to assess whether it represents publication usage activity by a person or not. For example, a single pulse of energy from piezoelectric transducer 1070 or sensor 1120 isolated in time from other such pulses generally is seen as not related to publication usage. However, repeated pulses from transducer 1070 or sensor 1120 are more likely to represent publication usage, such as a person turning the pages of a magazine, and may be regarded as an indication of such usage. Other characteristics of such pulses, such as pulse width, magnitude and/or frequency are also used in various embodiments to evaluate the likelihood that such pulses represent publication usage by a person. These characteristics also provide an indication of the manner of usage by the person. That is, relatively wide pulses (that is, pulses having a greater time duration), reflect slower page turning and a greater likelihood that the person using the magazine or other publication is paying greater attention to its contents. Narrower pulses can reflect less attention given to the contents of the publication, where, for example, the person is scanning the publication in a waiting room to "kill time" and is impatient.

A detected combination of sensor or transducer outputs indicating ongoing motion of, stress to or acceleration of the publication, together with an output from a light sensor, such as second sensor 1130 in the same time period, provide a strong indication that the publication is being used by a person and that the person has opened the publication between the pages where the system 1040 is affixed. In certain embodiments, the system 1040 stores the raw sensor data together with a time stamp in storage 1110 to be communicated to a data collector subsequently. In certain embodiments, the system 1040 selectively stores such raw data with a time stamp only when processor 1090 determines from an evaluation of such data that there is a sufficient probability the raw data represents publication usage. In certain embodiments, the processor 1090 processes the raw data using the clock pulses or time base provided by circuit 1092 or its internal clock to determine whether the raw data represents publication usage and/or the nature of such usage and produces data representing such usage which it stores in storage 1110 with or without a time stamp. In certain embodiments, processor 1090 transmits the raw or processed data directly to a data collector via RF module 1140 without storing it in storage 1110.

In certain embodiments, system 1040 receives publication usage data through communications received by RF module 1040. In certain embodiments, such data includes data communicated by a publisher or distributor indicating that the publication including system 1040 is being mailed or otherwise delivered to a subscriber or to a news stand or retailer of publications, or else identifies the type of subscriber such as a residential subscriber, library, academic institution or business organization, or provides a date stamp. Such data can also include data communicated by a news stand, retailer, library, shipper or other intermediary indicating its identity, location, a date stamp, and whether the publication was sold, given away or discarded.

Figure 14:
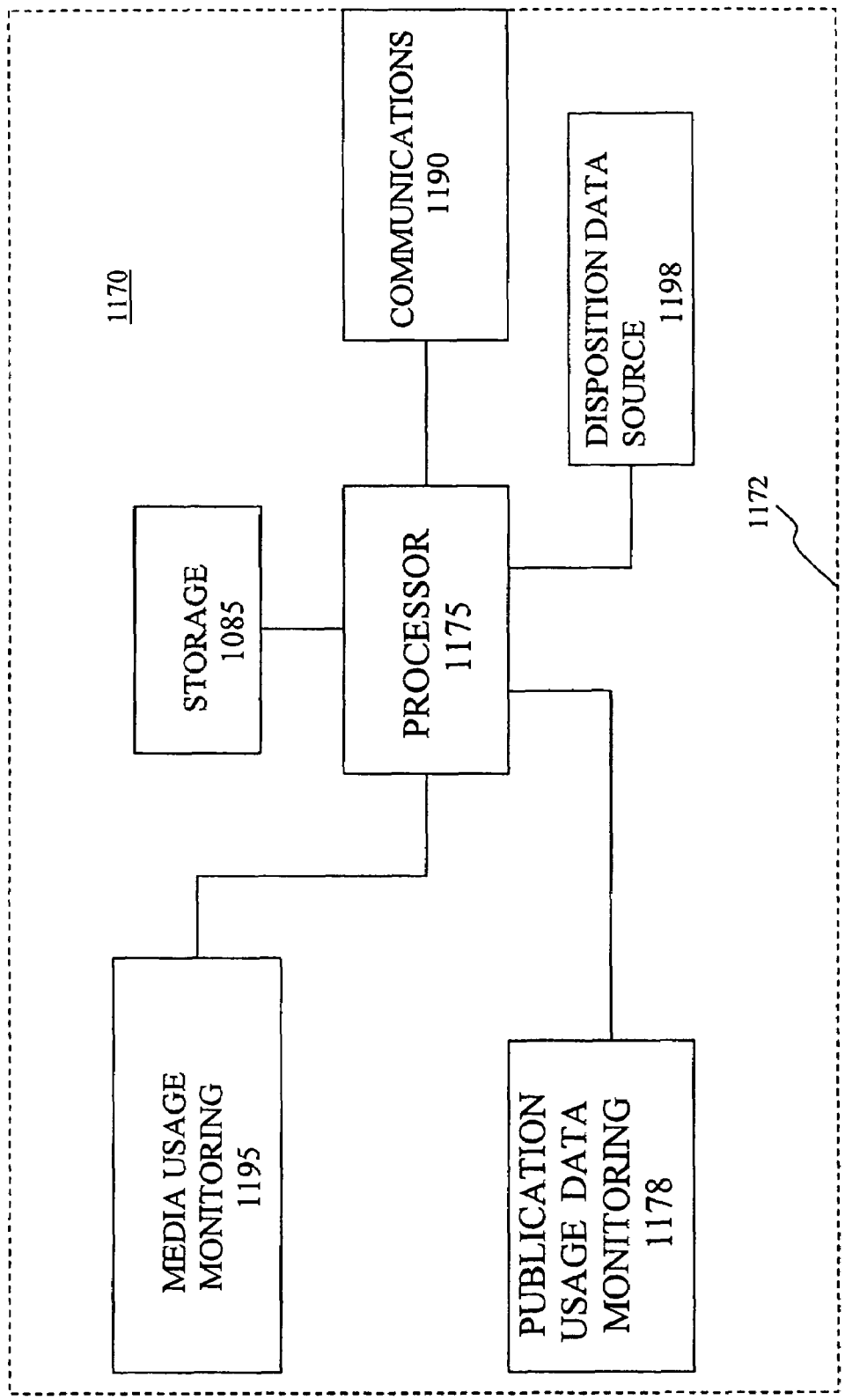
FIG. 14 is a functional block diagram of a portable monitor used with certain embodiments.

With reference again to FIG. 12, the system 1040 wirelessly transmits to and/or receives data from a portable monitor 1170 carried on the person of a respondent in ongoing market research including gathering data concerning exposure of the respondent/panelist to the publication 1000 including the system 1040, as well as other publications including similar devices. The portable monitor 1170 serves to store data representing data received from system 1040 as well as other such devices and subsequently communicates such data and/or a processed version thereof, along with data identifying the monitor and/or respondent, to a processing facility 1180 that gathers and processes such data from multiple monitors such as portable monitor 1170. In certain embodiments, the system 1040 transmits data to monitor 1170 comprising usage data relating to usage by the particular respondent carrying the monitor 1170, which monitor 1170 stores. In certain embodiments, the system 1040 stores and later transmits data to monitor 1170 comprising usage data relating to usage by persons other than the particular respondent carrying the monitor 1170, which monitor 1170 stores. In certain embodiments, the system 1040 stores and later transmits data to monitor 1170 data that has been communicated to system 1040 by a publisher, distributor, news stand, publication retailer, library, academic institution, business organization, or the like, and stored in the system 1040. In certain embodiments, communication between the system 1040 and monitor 1170 is used as an indication of proximity of the person carrying the monitor to the publication. In certain embodiments, the receipt of data by monitor 1170 from system 1040 and/or the receipt of data by system 1040 from monitor 1170 is used as an indication of proximity of the person carrying the monitor 1170 to the publication 1000. This data indicating proximity, in certain embodiments, is treated as publication usage data FIG. 14 provides a block diagram of an embodiment of portable monitor 1170. The monitor is housed in a suitable enclosure 1172, such as enclosures of the kind or size which house a cellular telephone, a pager, PDA, or portable media player, or an enclosure such as a wristwatch, key fob or article of jewelry. Overall operation of the portable monitor is controlled by a processor 1175. Data communications with system 1040 are carried out by monitor 1170 by means of an RF communications module 1178 coupled with processor 1175 to receive control data therefrom and to receive from and/or provide data to, processor 1175, for transmission to system 1040 or received therefrom. Processor 1175 is also coupled with storage 1185 to store data therein or retrieve data therefrom. Such data includes data received from publication usage monitoring systems such as system 1040. From time to time, portable monitor 1170 communicates its stored data to the processing facility 1180 via communications 1190.

In certain embodiments, monitor 1170 includes a media usage monitoring system 1195 which serves to monitor usage and/or exposure of the person carrying the monitor 1170 to media. For monitoring exposure to audio media, media usage monitoring 1195 preferably comprises a PPM™ system supplied by Arbitron Inc. of Columbia, Md., USA. In certain embodiments, the media usage monitoring system comprises an audio signature extraction system and/or an ancillary code decoder for monitoring exposure to audio media. In certain embodiments, the media usage monitoring system 1195 comprises a microphone to pick up audio media data which it supplies to the processor 1175 for producing data concerning exposure of the participant to audio media data and associated other data, such as video data. In certain embodiments, the system 1195 comprises a light detector to pick up remote control signals indicating selection of a channel or other source of media data. In certain embodiments, system 1195 comprises a receiver that picks up RF or intermediate-frequency energy indicating media data selected for exposure to the participant. In certain embodiments, system 1195 comprises manually-operable switches or other manually-operable devices used by the respondent to input media exposure data. In each case, processor 1175 produces media data exposure data which it stores in storage 1085 to provide records of media data to which the participant was exposed. Preferably, both the publication usage data and media data exposure data are stored along with a time stamp indicating times of usage, exposure and/or receipt, as appropriate. The time stamp preferably, but not necessarily, is obtained from a single clock (not shown for purposes of simplicity and clarity) so that the time stamps are all provided on the same time base.

In certain embodiments, monitor 1170 includes a disposition data source 1198 to provide data representing disposition of the monitor 1170. In certain ones of such embodiments, the disposition data source 1198 comprises a motion detector which produces data representing acceleration, velocity, speed or movement, from which a corresponding condition of the respondent may be inferred. Such data is supplied to processor 1175 which evaluates the data to assess the person's activity, such as sitting, standing, walking, and/or running, and/or to assess the person's environment, such as a train or automobile in motion, and aircraft in flight, and/or a stationary environment. In certain ones of such embodiments, the disposition data source 1198 comprises a location detector, such as a GPS receiver, a terrestrial signal receiver or inertial monitor, which produces data representing a location of the monitor 1170, from which a location of the respondent may be inferred. Such data is supplied to processor 1175 which evaluates the data to assess whether the monitor and/or respondent is at home, at work, at a retail store, place of amusement or other public place, moving from a stationary location or at a location other than a prior location. The processor 1175 stores data representing one or more of the foregoing activities, conditions and/or locations in storage 1185, from which such data is subsequently accessed for communication to facility 1180.

Figure 15:
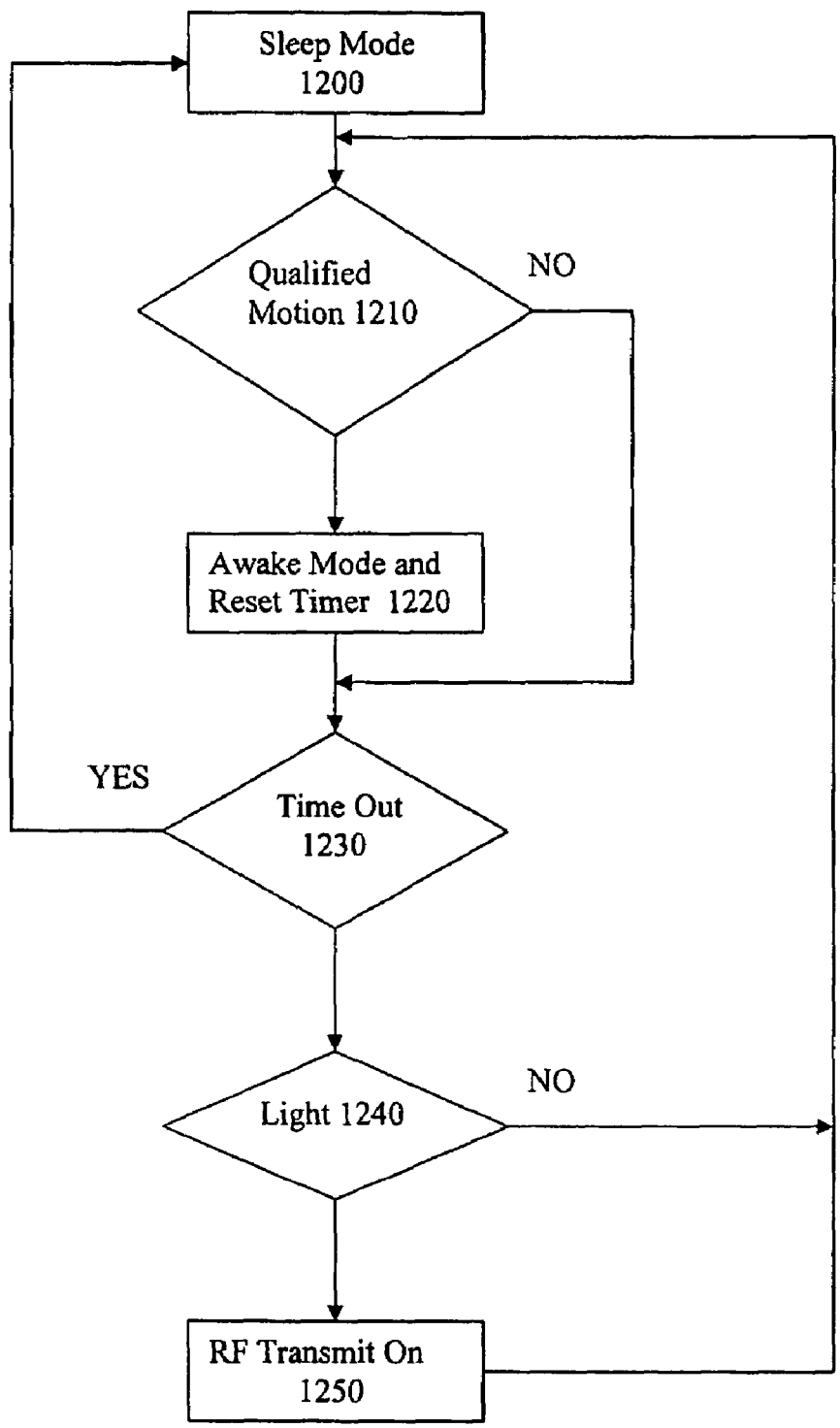
FIG. 15 is a flow chart illustrating a data gathering process employed in certain embodiments.

FIG. 15 provides a flow chart illustrating a data gathering process employed in certain embodiments of the system 1040 of FIGS. 12 and 13. Initially, the system operates in a "sleep" mode 1200 in which it monitors data produced by piezoelectric transducer 1070 and/or first sensor 1120 acting as a motion sensor. In the sleep mode, processor 1090 evaluates such data for patterns indicating a possibility that the publication 1000 is in use by a person. In certain embodiments, such patterns are recognized by the nature of the stresses experienced by the piezoelectric transducer 1070. For example, if a person repeatedly turns the pages of the publication 1000, this is manifested as a series of energy pulses output by the transducer 1070. If such pulses are received repeatedly by processor 1090 for a predetermined period of time, this is deemed to be qualified motion (1210) and processor 1090 switches to an "awake" mode at 1220. In this step, processor 1090 also resets an internal timer which then counts toward a predetermined count value representing a predetermined time period. After step 1220, processor 1090 checks the timer to see if it has reached the predetermined count, that is, whether the timer has "timed out". Since the timer has just been reset, processing continues to step 1240.

In the awake mode, processor 1090, as indicated at 1240, monitors the output from the second sensor 1130 for data indicating exposure to light, indicating that the publication has been opened between pages 1010 and 1020. If this occurs, the processor 1090 produces data representing this occurrence and at 1250 causes the RF module 1140 to transmit such data for receipt by a portable monitor 1170, if it is within range. Such data is transmitted repeatedly so long as light is detected by the second sensor 1130 and qualified motion is also found by processor 1090 to repeat within a predetermined period of time. If such motion is not found within the predetermined period of time so that step 1220 is bypassed and the timer is not reset, it is considered that the publication 1000 is no longer in use and the system 1040 causes the RF module 1140 to cease transmitting data and the system 1040 reverts to its sleep mode, as indicated at 1230.

Figure 16:
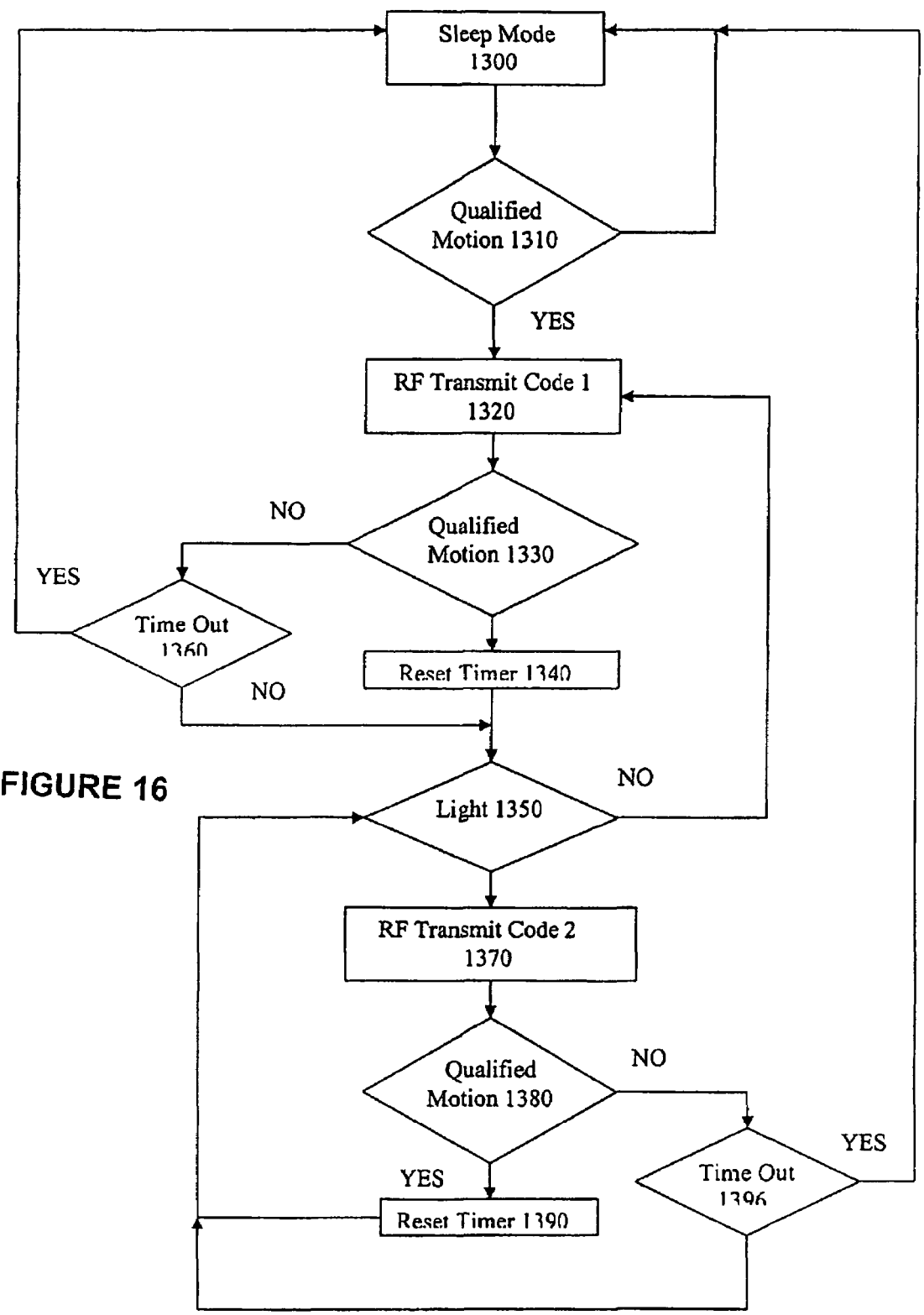
FIG. 16 is another flow chart illustrating a data gathering process employed in certain embodiments.

In certain embodiments, the system 1040 follows a different data gathering process illustrated in FIG. 16, wherein the system 1040 initially operates in a sleep mode in which processor 1090 evaluates received data for qualified motion (1310). When qualified motion is thus found, processor 1090 resets an internal timer which then begins to count toward a predetermined count value representing a predetermined time period. In a step 1320, processor 1090 accesses a code from storage 1110 corresponding to the detected motion event and controls RF module 1140 to transmit the code for receipt by a portable monitor 1170 if one is within range, as indicated at 1320.

In a step 1330, the processor 1090 again evaluates received data for qualified motion. If it is present, in step 1340 processor 1090 resets the timer and then checks in a step 1350 for receipt of data from the second sensor 1130 indicating exposure to light. If, however, qualified motion is not detected in step 1330, in a step 1360 the processor 1090 determines whether the internal timer has reached the predetermined count. If not, it checks for exposure to light in step 1350. But if the timer has reached its predetermined count indicating that the publication 1000 is no longer in use, as detected in step 1360, the system 1040 returns to its sleep mode 1300.

Where light is not detected in step 1350, processing returns to step 1320 to continue transmitting Code 1, to indicate that the publication 1000 is in use, although not opened between pages 1010 and 1020. If, however, light is detected in step 1350, in a step 1370, processor 1090 controls RF module 1140 to transmit a different code, Code 2, indicating that the publication 1000 is in use and is opened between pages 1010 and 1020.

After controlling RF module 1140 to transmit Code 2, processor 1090 again checks for a continuation of qualified motion in a step 1380. If qualified motion is found, processor 1090 resets the timer in a step 1390 and then returns to step 1350 to determine if light is still being received by the second sensor 1130. If qualified motion is not detected in step 1380, processor 1090 determines in a step 1396 whether the timer has timed out. If not, processing returns to step 1350 to check for light detection. But if the timer has reached its predetermined count before qualified motion has been detected, the system 1040 returns to its sleep mode 1300.

Figure 17:
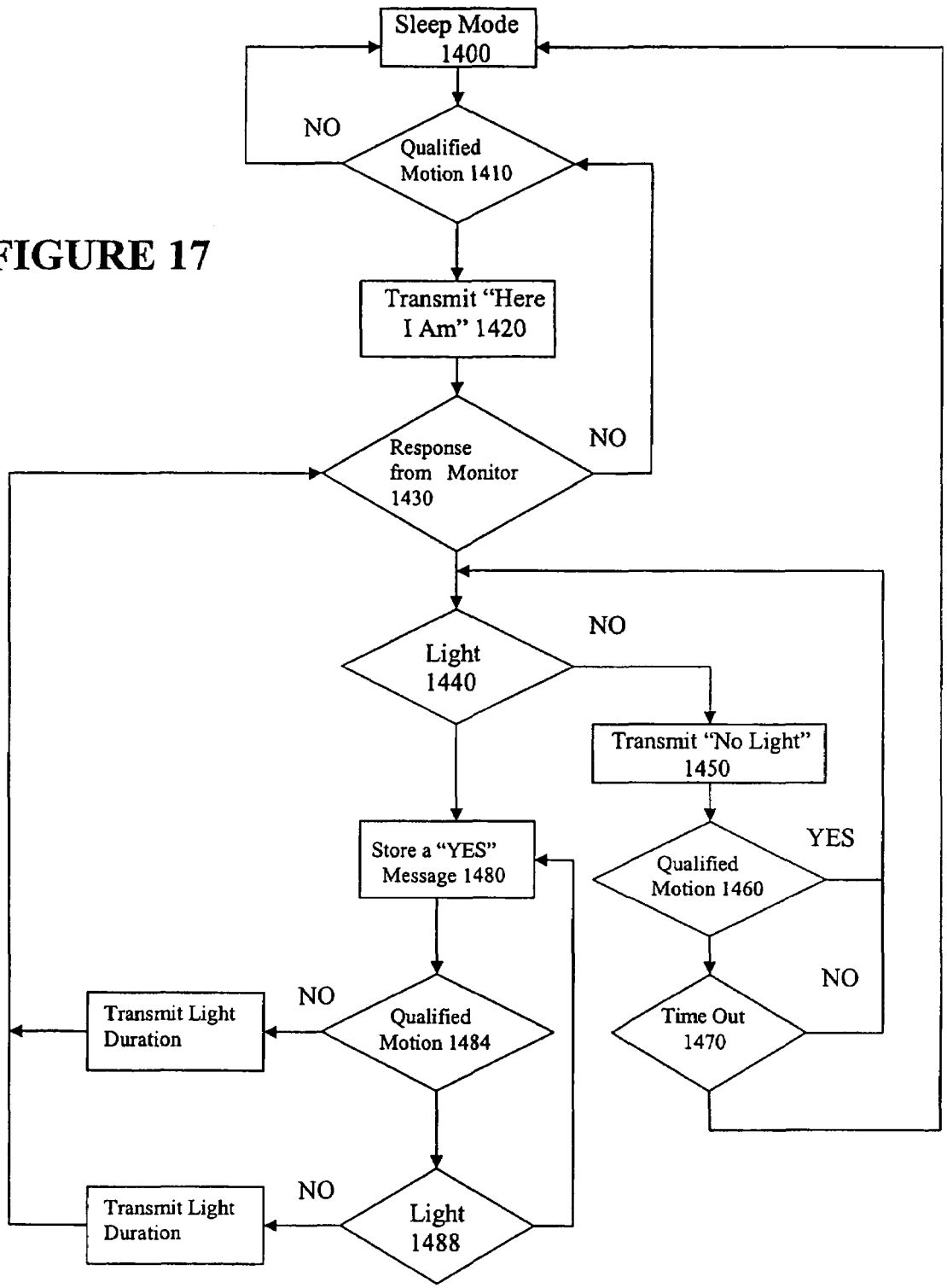
FIG. 17 is a further flow chart illustrating a data gathering process employed in certain embodiments.

In certain embodiments, the system 1040 follows a still different data gathering process illustrated in FIG. 17, wherein the system 1040 initially operates in a sleep mode 1400 in which processor 1090 evaluates received data for qualified motion (1410). In the absence of a detection of qualified motion by processor 1090, the system remains in sleep mode 1400. But in the event that processor 1090 detects qualified motion, it controls RF module 1140 to transmit data for receipt by any portable monitor 1170 within range, to inform the monitor that, in effect, "Here I am". System 1040 waits for receipt of a response from monitor 1170. In the absence of such a response, as indicated in a step 1430, the system returns to the sleep mode to check once again for qualified motion.

However, if system 1040 receives a response from a portable monitor, such as monitor 1170, processor 1090 then checks the second sensor 1130 for data indicating light exposure as indicated in step 1440. In the absence of light detection, processor 1090 controls RF module 1140 to transmit data to monitor 1170 to convey this information. See step 1450. In a subsequent step 1460, processor 1090 again checks for qualified motion. If such motion is detected, processor 1090 resets the timer and processing returns to step 1440 to check for light detection. If qualified motion is not detected in step 1460, in a step 1470, processor 1090 checks to see if the timer has timed out. If not, processing also returns to step 1440 to check for light. However, if qualified motion is not continuing and the timer has timed out, the system returns to the sleep mode 1400.

If light is detected in step 1440, in a step 1480 an indication of such detection is stored by processor 1090 in storage 1110, and processor 1090 then checks for continued qualified motion In a step 1484. If such motion is detected, the processor again checks for exposure to light in a step 1488. However, if either qualified motion is not detected in step 1484 or if exposure to light is not detected in step 1488, processing returns to step 1430 to check again for a response from a monitor 1170. If such a response has been received, processing continues to step 1440; otherwise, system 1040 returns to the sleep mode to monitor for the occurrence of further qualified motion.

It will be seen from FIG. 17 as well as from the discussion above, that in certain embodiments, the portable monitor 1170 provides data to the system 1040 to control its operation. In certain embodiments, the monitor 1170 provides parameters to the system 1040 to assist it in detecting publication usage by the respondent corresponding to the monitor 1170, such as the respondent's demographics and/or preferences in publication usage or data based on the foregoing to assist system 1040 in determining a likelihood that the publication 1000 is in use by the respondent when usage-type data is received by processor 1090 from the sensors 1120 and 1130 the transducer 1070. Such parameters supplied by the monitor 1170 to the system 1040 in certain embodiments include parameters indicating the characteristics of the particular respondent's typical usage of publications, such as data indicating the characteristic stresses and dispositions imposed on a publication by the particular respondent carrying the monitor 1170 when using a publication. In certain embodiments, the monitor 1170 provides updated or modified programming to the system 1040 which it stores in storage 1110 for controlling its operations. These embodiments enable improvements to be incorporated in the system 1040 without replacing it, which normally would not be practical if it is already incorporated into a publication, or where it is desired to avoid replacing the stocks of systems 1040 already in the hands of publishers and any others who incorporate them in publications.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A method of producing data concerning usage of a publication by a person, comprising:
   producing first data by means of a first data producing device in or on a publication, the first data representing usage of the publication by a person;
   producing time base data by means of a device in or on the publication; and
   producing usage data representing usage of the publication based on the first data and the time base data.

2. The method of claim 1, comprising producing second data by means of a second data producing device in or on the publication, the second data representing usage of the publication by a person.

3. The method of claim 2, comprising producing the usage data based on the second data.

4. A system for producing data concerning usage of a publication by a person, comprising:
   a first data producing device in or on a publication and operative to produce first data representing usage of the publication by a person;
   a time base data producing device in or on the publication and operative to produce time base data; and
   a processor operative to produce usage data representing usage of the publication based on the first data and the time base data.

* * * * *